United States Patent
Takahashi et al.

(10) Patent No.: US 10,756,383 B2
(45) Date of Patent: Aug. 25, 2020

(54) ALL SOLID STATE SECONDARY-BATTERY ADDITIVE, ALL-SOLID-STATE SECONDARY BATTERY, AND METHOD FOR PRODUCING SAME

(71) Applicants: OSAKA RESEARCH INSTITUTE OF INDUSTRIAL SCIENCE AND TECHNOLOGY, Izumi-shi, Osaka (JP); SUMITOMO SEIKA CHEMICALS CO., LTD., Kako-gun, Hyogo (JP)

(72) Inventors: Masanari Takahashi, Osaka (JP); Mari Yamamoto, Osaka (JP); Yasuyuki Kobayashi, Osaka (JP); Shingo Ikeda, Osaka (JP); Yukiyasu Kashiwagi, Osaka (JP); Masashi Saitoh, Osaka (JP); Shuichi Karashima, Osaka (JP); Kiyoshi Nishioka, Himeji (JP); Ryo Miyabara, Osaka (JP)

(73) Assignees: OSAKA RESEARCH INSTITUTE OF INDUSTRIAL SCIENCE AND TECHNOLOGY, Osaka (JP); SUMITOMO SEIKA CHEMICALS CO., LTD., Kako-gun (JP)

( * ) Notice: Subject to any disclaimer, the term of this patent is extended or adjusted under 35 U.S.C. 154(b) by 47 days.

(21) Appl. No.: 15/753,077

(22) PCT Filed: Aug. 16, 2016

(86) PCT No.: PCT/JP2016/073938
§ 371 (c)(1),
(2) Date: Feb. 15, 2018

(87) PCT Pub. No.: WO2017/030127
PCT Pub. Date: Feb. 23, 2017

(65) Prior Publication Data
US 2018/0241077 A1    Aug. 23, 2018

(30) Foreign Application Priority Data

Aug. 17, 2015   (JP) ................. 2015-160469

(51) Int. Cl.
*H01M 4/62* (2006.01)
*C08L 69/00* (2006.01)
(Continued)

(52) U.S. Cl.
CPC ......... *H01M 10/0525* (2013.01); *H01M 4/13* (2013.01); *H01M 4/139* (2013.01);
(Continued)

(58) Field of Classification Search
CPC ........ H01M 4/13; H01M 4/131; H01M 4/133; H01M 4/139; H01M 4/62; H01M 10/0525;
(Continued)

(56) References Cited

U.S. PATENT DOCUMENTS 6,605,237 B2 * 8/2003 Allcock ............... C08G 79/025
252/500
2009/0142669 A1 * 6/2009 Shinohara ............... C03B 5/06
429/320
(Continued)

FOREIGN PATENT DOCUMENTS

CN    104600357 A    5/2015
CN    104641496 A    5/2015
(Continued)

OTHER PUBLICATIONS

Machine translation for Okumura et al., JP 2005-044704 A. (Year: 2019).*
(Continued)

*Primary Examiner* — Maria Laios
(74) *Attorney, Agent, or Firm* — Westerman, Hattori, Daniels & Adrian, LLP

(57) ABSTRACT

General Formula (I)

(Continued)

Provided is an all solid state secondary-battery additive comprising a polyalkylene carbonate (I) represented by general formula (I), and by providing such additive, properties such as the charge-discharge capacity and interfacial resistance of an all-solid-state secondary battery are improved. (In general formula (I), $R^1$ and $R^2$ are each a C1-10 chain-like alkylene group or C3-10 cycloalkylene group, m is 0, 1, or 2 and n is an integer of 10 to 15000, and each $R^1$, $R^2$ and m in the polyalkylene carbonate (I) chain is independently the same or different.)

14 Claims, 5 Drawing Sheets

(51) Int. Cl.
| | | |
|---|---|---|
| H01M 10/0525 | (2010.01) | |
| H01M 10/0562 | (2010.01) | |
| H01M 4/13 | (2010.01) | |
| H01M 10/0585 | (2010.01) | |
| H01M 4/139 | (2010.01) | |
| H01M 10/058 | (2010.01) | |
| H01M 4/131 | (2010.01) | |
| H01M 4/133 | (2010.01) | |
| H01M 4/02 | (2006.01) | |

(52) U.S. Cl.
CPC .......... *H01M 4/62* (2013.01); *H01M 10/058* (2013.01); *H01M 10/0562* (2013.01); *H01M 10/0585* (2013.01); *H01M 2004/027* (2013.01); *H01M 2004/028* (2013.01); *H01M 2300/0068* (2013.01)

(58) Field of Classification Search
CPC .......... H01M 10/0562; H01M 10/058; H01M 10/0585; H01M 2004/028; H01M 2004/027; H01M 2300/0068; C08L 69/00; C08L 2203/20; H01B 1/06
See application file for complete search history.

(56) References Cited

U.S. PATENT DOCUMENTS

| 2015/0194704 A1 | 7/2015 | Garsuch et al. |
| 2015/0349378 A1 | 12/2015 | Ose et al. |
| 2017/0005337 A1 | 1/2017 | Ikejiri et al. |

FOREIGN PATENT DOCUMENTS

| JP | 2000-17017 A | 1/2000 |
|---|---|---|
| JP | 2004-342423 A | 12/2004 |
| JP | 2004342423 A * | 12/2004 |
| JP | 2005-44704 A | 2/2005 |
| JP | 2005-50687 A | 2/2005 |
| JP | 2005044704 A * | 2/2005 |
| JP | 2006-294457 A | 10/2006 |
| JP | 2014-137869 A | 7/2014 |
| JP | 2014-212022 A | 11/2014 |
| WO | 2015087734 A1 | 6/2015 |

OTHER PUBLICATIONS

Jonas Andersson, "Synthesis of polycarbonate polymer electrolytes for lithium ion batteries and study of additives to raise the ionic conductivity", Examensarbete, Jan. 1, 2015. (Year: 2015).*
Machine translation for Sawa, JP 2004-342423 A. (Year: 2004).*
"Poly*trinnethylene carbonate)". Polymers: A Property Database 2018. CRC Press, Taylor & Francis Group. (Accessed on: Jun. 21, 2019.) (Year: 2018).*
International Search Report dated Nov. 15, 2016, issued in counterpart application No. PCT/JP2016/073938. (2 pages).
Notification of Transmittal of Translation of the International Preliminary Report on Patentability (Form PCT/IB/338) issued in counterpart International Application No. PCT/JP2016/073938 dated Mar. 1, 2018, with Forms PCT/IB/373 and PCT/ISA/237. (9 pages).
European Search Report dated Feb. 11, 2019 issued in counterpart EP application No. 16837116.9. (8 pages).
Gerrit A. Luinstra, et al; Material Properties of Poly(Propylene Carbonates), Advances in Polymer Science, Jan. 1, 2011, XP055336276, ISSN: 0065-3195, vol. 245, pp. 29-48, Springer, Germany. (21 pages). Cited in European Search Report dated Feb. 11, 2019.
Bing Sun et al.; Polycarbonate-based solid polymer electrolytes for Li-ion batteries, Solid State Ionics, Sep. 1, 2014 pp. 738-742, XP055544072, ISSN: 0167-2738. (5 pages). cited in European Search Report dated Feb. 11, 2019.
Jonas Andersson; Synthesis of polycarbonate polymer electrolytes for lithium ion batteries and study of additives to raise the ionic conductivity, Examensarbete, Jan. 1, 2015, XP055544079, Retrieved from the Internet: URL:https://pdfs.semanticscholar.org/a611/d158c93ee4ca2b7d5dbaf688cff8644331af.pdf.(31 pages). cited in European Search Report dated Feb. 11, 2019.
Office Action dated Mar. 16, 2020, issued in counterpart TW Application No. 105128225, w/Japanese translation (12 pages).
Andersson, Jonas, "Synthesis of polycarbonate polymer electrolytes for lithium ion batteries and study of additives to raise the ionic conductivity", Jun. 1, 2015, 14 and 25 pp. 4-11; Cited in TW Office Action dated Mar. 16, 2020.
Office Action dated Apr. 9, 2020, issued in counterpart EP application No. 16837116.9. (7 pages).
Office Action dated Jun. 22, 2020, issued in counterpart CN Application No. 201680047751.6, with English Translation. (18 pages).

* cited by examiner

ALL SOLID STATE SECONDARY-BATTERY ADDITIVE, ALL-SOLID-STATE SECONDARY BATTERY, AND METHOD FOR PRODUCING SAME

TECHNICAL FIELD

The present invention relates to an all-solid secondary battery additive, an all-solid secondary battery and a producing method thereof. Being heat-treated, the additive can develop a property such as reducing grain boundary resistance between the solid electrolytes and interfacial resistance between a solid electrolyte and an active material.

BACKGROUND ART

Since lithium ion secondary battery has high voltage and high capacity, it is widely used as power source for mobile phones, digital cameras, video cameras, laptop computers, electric cars, etc. A generally used lithium ion secondary battery uses a liquid electrolyte obtained by dissolving an electrolytic salt in a nonaqueous solvent. Since the nonaqueous solvent contains a large amount of flammable solvent, ensuring the safety has been desired.

In order to ensure the safety, an all-solid secondary battery whose elements are formed from a solid material (a positive electrode active material, a negative electrode active material, a solid electrolyte, etc.) was proposed without a non-aqueous solvent (JP2014-137869A:Patent Document 1, JP2014-212022A:Patent Document 2). The all-solid secondary battery comprises a positive electrode, a negative electrode and a solid electrolyte layer between the positive electrode and the negative electrode, all of which are made of a solid material. The positive electrode or the negative electrode of the all-solid secondary battery may comprise the solid electrolyte in order to improve the ionic conductivity of the interface between the positive electrode active material and the negative electrode active material which constitute the electrodes.

In Patent Document 1, a positive electrode, a negative electrode and a solid electrolyte layer are obtained by binding a solid material with a binder resin such as polyvinyl pyrrolidone and butylene rubber. Patent Document 2 proposes a technique of removing a binder resin used in producing constituent elements of the battery by a heat treatment from the viewpoint of preventing problems such as deterioration of the solid material due to the binder resin and internal short circuit due to the binder resin.

RELATED ART DOCUMENT

Patent Documents

[Patent Document1] JP2014-137869A
[Patent Document2] JP2014-212022A

SUMMARY OF THE INVENTION

Problems to be Solved by the Invention

The conventional binder resins disclosed in Patent Documents 1 and 2 cause resistance in charge and discharge reactions, which causes decrease of discharge capacity. Therefore, in Patent Document 2, it is thought there is a need to remove the binder resin after production. Since removal of the binder resin (polyvinyl acetal resin) examined in Patent Document 2 requires a high temperature heat treatment at 400° C., the coexisting sulfide solid electrolyte deteriorates and the ionic conductivity decreases, thereby the all-solid battery performance deteriorates. Further, since a solid electrolyte layer, a positive electrode and a negative electrode of the all-solid battery obtained by removing the binder resin comprise many voids, the properties such as charge/discharge capacity is reduced as compared to an all-solid battery obtained by press-molding a solid material without a binder resin even if pressed after the removal. Therefore, it has been desired to provide a process material for producing an all-solid battery capable of solving such a drawback and realizing further improvement of the properties.

Means to Solve the Problems

The inventors of the present invention have attempted to produce a positive electrode, a negative electrode, a solid electrolyte layer and an all-solid battery with various binder resins. In addition, the inventors have attempted to remove the binder resin based on the technical idea as in Patent Document 2. Among these attempts, the present inventors have reached the present invention by discovering that a specific binder resin can be thermally decomposed at a low temperature at which the sulfide solid electrolyte does not deteriorate and can solve the above problems.

Thus, according to the present invention, there is provided an all-solid secondary battery additive comprising a polyalkylene carbonate, characterized in that the polyalkylene carbonate has an alkylene carbonate moiety (II) represented by general formula (II):

[Chemical formula 1]

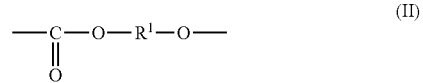

(In the formula (II), $R^1$ is a chain alkylene group having 1 to 10 carbon atoms or a cycloalkylene group having 3 to 10 carbon atoms.) and optionally an alkylene glycol moiety (III) represented by general formula (III):

[Chemical formula 2]

(In the formula (III), $R^2$ is a chain alkylene group having 1 to 10 carbon atoms or a cycloalkylene group having 3 to 10 carbon atoms, m is 0, 1 or 2 and each $R^2$ in the alkylene glycol moiety (III) is the same or different.).

Furthermore, there is provided an all-solid secondary battery additive comprising a polyalkylene carbonate (I) represented by general formula (I):

[Chemical formula 3]

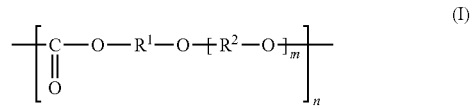

(In the formula (I), each of $R^1$ and $R^2$ is a chain alkylene group having 1 to 10 carbon atoms or a cycloalkylene group having 3 to 10 carbon atoms, m is 0, 1 or 2, n is an integer of 10 to 15000, each of $R^1$, $R^2$ and m in the polyalkylene carbonate (I) chain is independently the same or different.).

A solid electrolyte layer for an all-solid secondary battery comprising a positive electrode, a negative electrode and the solid electrolyte layer positioned between the positive electrode and the negative electrode, characterized in that the solid electrolyte layer comprises the all-solid secondary battery additive and a solid electrolyte, wherein the solid electrolyte is selected from $Z_2S-M_xS_y$ (Z is one or more selected from Li and Na, M is one or more selected from P, Si, Ge, B, Al and Ga, and x and y are numbers giving stoichiometric ratios depending on the type of M.), $Z_2S-M_nS_m$—ZX (Z is one or more selected from Li and Na, M is one or more selected from P, Si, Ge, B, Al and Ga, X is one or more selected from Cl, Br and I, and n and m are numbers giving stoichiometric ratios depending on the type of M), $Li_{3x}La_{2/3-x}TiO_3$ (0<x<0.17), $Li_{1+x}Al_xTi_{2-x}(PO_4)_3$ (0<x<2), $Li_7La_3Zr_2O_{12}$ and $Li_{1+x}Al_xGe_{2-x}(PO_4)_3$ (0<x<2).

There is provided a positive electrode for an all-solid secondary battery comprising the positive electrode, a negative electrode and a solid electrolyte layer positioned between the positive electrode and the negative electrode, characterized in that the positive electrode comprises a positive electrode active material, a solid electrolyte and the all-solid secondary battery additive.

Further, there is provided a negative electrode for an all-solid secondary battery comprising a positive electrode, the negative electrode and a solid electrolyte layer positioned between the positive electrode and the negative electrode, characterized in that the negative electrode comprises a negative electrode active material, a solid electrolyte and the all-solid secondary battery additive.

There is provided an all-solid secondary battery comprising a positive electrode, a negative electrode and a solid electrolyte layer positioned between the positive electrode and the negative electrode, characterized in that at least one of the positive electrode, the negative electrode and the solid electrolyte layer comprises the all-solid secondary battery additive.

There is provided an all-solid secondary battery comprising a positive electrode, a negative electrode and a solid electrolyte layer positioned between the positive electrode and the negative electrode, characterized in that at least one of the positive electrode, the negative electrode and the solid electrolyte layer comprises a heat-treated product of the all-solid secondary battery additive.

There is provided a producing method of an all-solid secondary battery characterized in comprising a step of obtaining a solid electrolyte slurry by dissolving or dispersing a solid electrolyte and the all-solid secondary battery additive in an organic solvent;

a step of obtaining a positive electrode slurry by dissolving or dispersing the additive, a solid electrolyte and a positive electrode active material in an organic solvent, a step of obtaining a negative electrode slurry by dissolving or dispersing the additive, a solid electrolyte and a negative electrode active material in an organic solvent, a step of obtaining a solid electrolyte layer, a positive electrode and a negative electrode by coating and drying each of the slurries on a substrate, a step of obtaining a laminate by laminating the solid electrolyte layer, the positive electrode and the negative electrode; and a step of heat-treating the laminate;

wherein the solid electrolyte is selected from $Z_2S-M_xS_y$ (Z is one or more selected from Li and Na, M is one or more selected from P, Si, Ge, B, Al and Ga, and x and y are numbers giving stoichiometric ratios depending on the type of M.), $Z_2S-M_nS_m$—ZX (Z is one or more selected from Li and Na, M is one or more selected from P, Si, Ge, B, Al and Ga, X is one or more selected from Cl, Br and I, and n and m are numbers giving stoichiometric ratios depending on the type of M), $Li_{3x}La_{2/3-x}TiO_3$ (0<x<0.17), $Li_{1+x}Al_xTi_{2-x}(PO_4)_3$ (0<x<2), $Li_7La_3Zr_2O_{12}$ and $Li_{1+x}Al_xGe_{2-x}(PO_4)_3$ (0<x<2).

Effect of the Invention

According to the additive in the present invention, a positive electrode, a negative electrode, a solid electrolyte layer and an all-solid secondary battery with improved properties such as a charge-discharge capacity can be provided.

In addition, when each of the alkylene carbonate moiety (II) and the alkylene glycol moiety (III) in the polyalkylene carbonate (I) in the additive comprises an ethylene group, a propylene group or a cyclohexylene group as $R^1$ or $R^2$, the positive electrode, the negative electrode, the solid electrolyte layer and the all-solid secondary battery with further improved properties can be provided.

According to the producing method of an all-solid secondary battery in the present invention, the additive functions as a binder resin for maintaining the sheet shape of the positive electrode, the negative electrode and the solid electrolyte during the production, while the heat-treated product of the remained additive after the decomposition by the heat treatment step reduces the grain boundary resistance between the solid electrolytes and the interfacial resistance between the solid electrolyte and the active material, thereby an all-solid secondary battery with improved properties can be easily produced.

In the production method, when the solid electrolyte is $Li_2S$—$P_2S_5$ and each of $R^1$ and $R^2$ of the alkylene carbonate moiety (II) and the alkylene glycol moiety (III) is an ethylene group, a propylene group or a cyclohexylene group, an all-solid secondary battery with further improved properties can be easily produced.

Furthermore, in the production method, when the heat treatment is performed at a temperature between T−25° C. and T+50° C. where T is a decomposition starting temperature of the additive, a solid electrolyte for an all-solid secondary battery with further improved properties can be easily produced.

ALL-SOLID SECONDARY BATTERY ADDITIVE

Figure 1A:
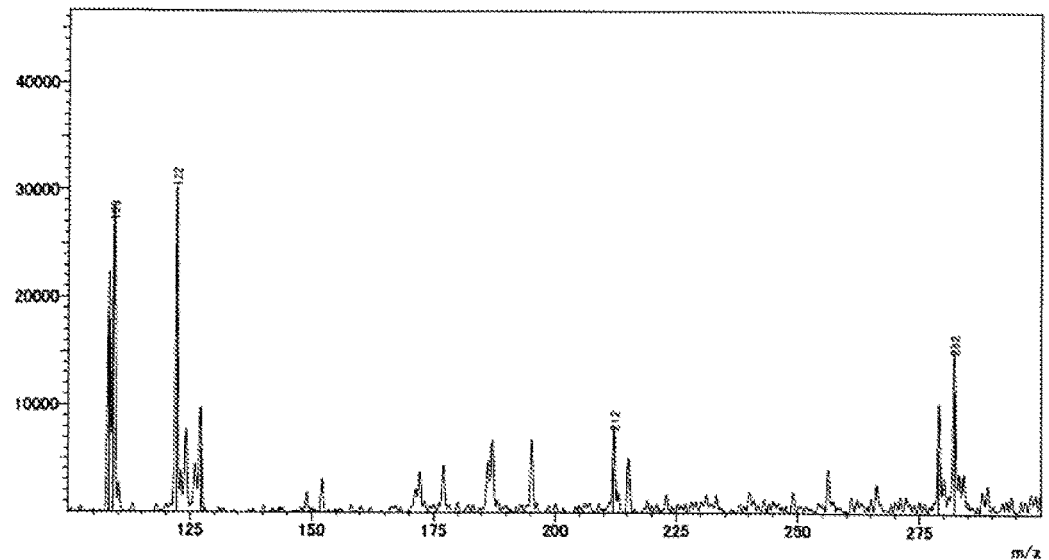
FIG. 1A shows a spectrum chart obtained by DART-MS measurement of an anisole extract of a battery using the ether chain-containing PPC according to Example 7-6.

In the present invention, an all-solid secondary battery additive (hereinafter also referred to simply as "additive") is a material used for the reasons/purpose such as: ability to form any one of a positive electrode, a solid electrolyte layer and a negative electrode constituting an all-solid secondary battery in the form of a sheet; ability to hardly inhibit an ionic conduction between solid electrolytes and/or; ability to reduce grain boundary resistance between solid electrolytes constituting an all-solid secondary battery and/or interfacial resistance between a solid electrolyte and an active material after heat treatment.

The additive comprises a polyalkylene carbonate characterized in that the polyalkylene carbonate has an alkylene carbonate moiety (II) represented by general formula (II):

[Chemical formula 4]

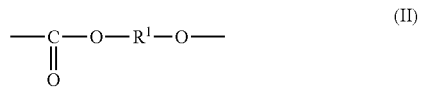

(II)

(In the formula (II), R$^1$ is a chain alkylene group having 1 to 10 carbon atoms or a cycloalkylene group having 3 to 10 carbon atoms.) and
optionally an alkylene glycol moiety (III) represented by general formula (III):

[Chemical Formula 5]

(III)

(In the formula (III), R$^2$ is a chain alkylene group having 1 to 10 carbon atoms or a cycloalkylene group having 3 to 10 carbon atoms, m is 0, 1 or 2 and each R$^2$ in the alkylene glycol moiety (III) is the same or different.)

Here, the polyalkylene carbonate may have a structure represented by an arbitrary formula in addition to the alkylene carbonate moiety (II) and the optional alkylene glycol moiety (III) in the polymer chain.

The polyalkylene carbonate comprised in the additive is preferably represented by the following general formula (I):

[Chemical Formula 6]

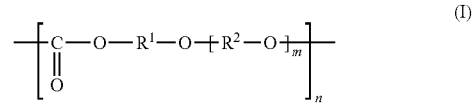

(I)

(In the formula (I), each of R$^1$ and R$^2$ is a chain alkylene group having 1 to 10 carbon atoms or a cycloalkylene group having 3 to 10 carbon atoms, m is 0, 1 or 2, n is an integer of 10 to 15000,
each of R$^1$, R$^2$ and m in the polyalkylene carbonate (I) chain is independently the same or different.)

In the present specification, the ether chain refers to the alkylene glycol moiety (III) and the ether chain-containing polyalkylene carbonate (I) (for example, ether chain-containing PPC) refers to a polyalkylene carbonate (I) having the alkylene glycol moiety (III) higher than a detection limit (0.01 mass % or more relative to the alkylene carbonate moiety (II)) in the molecule. The ether chain-containing polyalkylene carbonate (I) comprises an alkylene glycol moiety (III) where m is 1 or 2 in addition to the alkylene glycol moiety (III) where m is 0.

The ether chain-free polyalkylene carbonate (I) (for example, ether chain-free PPC) refers to polyalkylene carbonate (I) having an alkylene glycol moiety (III) less than a detection limit (less than 0.01 mass % relative to the alkylene carbonate moiety (II)) or the polyalkylene carbonate (I) not containing the alkylene glycol moiety (III) in the molecule. In this case, it is defined that m in the alkylene glycol moiety (III) in the polyalkylene carbonate (I) chain is only 0. That is, in the ether chain-free polyalkylene carbonate (I) chain, the alkylene glycol moiety (III) is substantially not present.

The composition ratio of the alkylene carbonate moiety (II) and the alkylene glycol moiety (III) in the polyalkylene carbonate (I) chain was determined with nuclear magnetic resonance spectroscopy (NMR).

The polyalkylene carbonate (I) was dissolved in deuterochloroform and measured at 25° C. for $^1$H-NMR to determine the composition ratio from a ratio of integral value of a peak attributed to hydrogen bonded to a carbon atom adjacent to a carbonate group appearing in the range of 4.0 to 5.2 ppm and integral value of a peak attributed to hydrogen bonded to a carbon atom adjacent to a ether group appearing in the range of 3.0 to 3.7 ppm.

Examples of the chain alkylene group having 1 to 10 carbon atoms in the alkylene carbonate moiety (II) and the alkylene glycol moiety (III) comprise a linear alkylene group such as an ethylene group, a trimethylene group, a tetramethylene group, a pentamethylene group, a hexamethylene group and a heptamethylene group and an octamethylene group, a nonamethylene group and a decamethylene group; and a branched alkylene group such as a propylene group, a 1,2-butylene group and a 1,2-dimethylethylene group.

Examples of the cycloalkylene group having 3 to 10 carbon atoms in the alkylene carbonate moiety (II) and the alkylene glycol moiety (III) comprises a cycloalkylene group such as a cyclopropylene group, a cyclobutylene group, a cyclopentylene group, a cyclohexylene group, a cyclooctylene group, a cyclononylene group and a cyclodecylene group.

$R^1$ or $R^2$ may comprise both a chain alkylene group and a cycloalkylene group.

Among these divalent groups, an ethylene group, a propylene group or a cyclohexylene group is preferred from the viewpoint of availability and improvement of the effect of reducing interfacial resistance.

When n is 10 or more and 15000 or less, the viscosity in preparing the slurry, the dispersibility of such as solid sulfide, an active material and a conductive assistant and; the coatability of the slurry are appropriate. Preferably, n is an integer of 100 to 7000.

As to the ratio of the alkylene carbonate moiety (II) and the alkylene glycol moiety (III) in the polyalkylene carbonate (I) chain, alkylene glycol moiety (III) relative to the alkylene carbonate moiety (II) is 0 to 6.0 mass %, preferably 0.5 to 5.0 mass %.

The polyalkylene carbonate (I) may be any one or combination of ether chain-free polyalkylene carbonate (I) and ether chain-containing polyalkylene carbonate (I) and preferably comprises ether chain-containing polyalkylene carbonate (I) from the viewpoint of improving battery performance.

The additives may comprise other components such as inorganic salts of alkali metals. Examples of the inorganic salt of alkali metal include lithium chloride, lithium hydroxide, lithium iodide, lithium acetate, lithium nitrate, lithium benzoate, lithium trifluoromethanesulfonate, lithium perchlorate, lithium bis(fluorosulfonyl)imide, lithium phosphate, lithium fluoride, sodium fluoride, sodium chloride, potassium chloride and cesium chloride. Preferable examples include lithium chloride, lithium hydroxide, lithium iodide, lithium acetate, lithium nitrate, lithium benzoate and cesium chloride.

The content of the alkali metal salt is 20 ppm to 5000 ppm, preferably 100 ppm to 1000 ppm, relative to the polyalkylene carbonate (I).

The additive may comprise polyalkylene glycol. The alkylene group in the polyalkylene glycol is a linear or branched alkyl group having 2 to 8 carbon atoms, preferably a linear or branched alkyl group having 2 to 4 carbon atoms. Specific examples thereof include polyethylene glycol, polypropylene glycol and polybutylene glycol. The terminal structure of the polyalkylene glycol may be an alkyl group such as a methyl group and an ethyl group. The molecular weight of the polyalkylene glycol is not particularly limited, and polyalkylene glycol having a molecular weight of 200 to 10000 is preferred. The ether chain-free polyalkylene carbonate (I) may be used in combination with the polyalkylene glycol.

The content of the polyalkylene glycol relative to the polyalkylene carbonate (I) is 0.1 to 6.0 mass %, preferably 0.5 to 5.0 mass %.

The method for producing the polyalkylene carbonate (I) is not particularly limited, and a known method for producing polyalkylene carbonate (I) can be used. For example, the example of the method for producing the polyalkylene carbonate (I) includes a method of polymerizing various alkylene oxides and carbon dioxide in the presence of a metal catalyst. Examples of the metal catalyst include an aluminum catalyst, a zinc catalyst, and a cobalt catalyst, and these catalysts may be organometallic catalysts. For example, an organozinc catalyst can be used as a catalyst for producing the ether chain-containing polyalkylene carbonate, and an organic cobalt catalyst can be used as a catalyst for producing the ether chain-free polyalkylene carbonate.

Examples of the alkylene oxide includes ethylene oxide, propylene oxide, 1-butene oxide, 2-butene oxide, isobutylene oxide, 1-pentene oxide, 2-pentene oxide, 1-hexene oxide, 1-octene oxide, 1-decene oxide, cyclopentene oxide, and cyclohexene oxide. These alkylene oxides may be used alone or in combination of two or more.

<Solid Electrolyte Layer, Positive Electrode, Negative Electrode and all Solid Secondary Battery>

The all-solid secondary battery comprises a positive electrode, a negative electrode, and a solid electrolyte layer positioned between the positive electrode and the negative electrode. At least one of the positive electrode, the negative electrode, and the solid electrolyte layer may comprise the additive.

(1) Solid Electrolyte Layer

The solid electrolyte layer includes a solid electrolyte and the additive.

The solid electrolyte may be one or more selected from $Z_2S-M_xS_y$ (Z is one or more selected from Li and Na, M is one or more selected from P, Si, Ge, B, Al and Ga, and x and y are numbers giving stoichiometric ratios depending on the type of M.). Examples of $M_xS_y$ include solid sulfides such as $P_2S_5$, $SiS_2$, $GeS_2$, $B_2S_3$, $Al_2S_3$ and $Ga_2S_3$. Examples of specific solid sulfides include $Li_2S$—$P_2S_5$, $Li_2S$—$SiS_2$, $Na_2S$—$P_2S_5$ and $Na_2S$—$SiS_2$. In addition, the solid sulfide may comprise $M_xS_y$ where M is different. The solid electrolyte may be one or more selected from $Z_2S-M_nS_m$—ZX (Z is one or more selected from Li and Na, M is one or more selected from P, Si, Ge, B, Al and Ga, X is one or more selected from Cl, Br and I, and n and m are numbers giving stoichiometric ratios depending on the type of M). Examples of $M_nS_m$ include solid sulfides such as $P_2S_5$, $SiS_2$, $GeS_2$, $B_2S_3$, $Al_2S_3$, and $Ga_2S_3$. Specific examples of the solid sulfides include $Li_2S$—$P_2S_5$—$LiCl$, $Li_2S$—$P_2S_5$—$LiBr$—$LiCl$, $Li_2S$—$SiS_2$—$LiBr$, $Na_2S$—$P_2S_5$—$LiBr$, and $Na_2S$—$SiS_2$—$LiI$. Further, the solid sulfide may comprise $M_nS_m$ where M is different and ZX where X is different. In addition to the solid sulfides, $Li_{3x}La_{2/3-x}TiO_3$ ($0<x<0.17$), $Li_{1+x}Al_xTi_{2-x}(PO_4)_3$ ($0<x<2$), $Li_7La_3Zr_2O_{12}$, $Li_{1+x}Al_xGe_{2-x}(PO_4)_3$ ($0<x<2$), $Na_{1+x}Al_xTi_{2-x}(PO_4)_3$ ($0<x<2$), $Na_7La_3Zr_2O_{12}$, and $Na_{1+x}Al_xGe_{2-x}(PO_4)_3$ (0<x<2) can also be used. These solid electrolytes may be used singly or in combination. An example of a preferable solid electrolyte is $Li_2S$—$P_2S_5$ where the molar ratio of $Li_2S$ to $P_2S_5$ is $Li_2S$: $P_2S_5$=50:50 to 95:5.

The shape of the solid electrolyte is not particularly limited, and may be a spherical shape, a ribbon shape, a wire shape, a rod shape, a flat plate shape, a cubic shape and an octahedral shape, but is generally granular. The particle size thereof is not particularly limited, but is generally 0.1 to 20 µm.

In addition to the additive and the solid electrolyte, the solid electrolyte layer may comprise other components such as an inorganic salt of an alkali metal. Examples of the inorganic salt of alkali metal include LiBr, LiCl, LiI, LiSCN, $LiBF_4$, $LiAsF_4$, $LiClO_4$, $LiPF_6$, NaBr, NaCl, NaI, NaSCN, $NaBF_4$, $NaAsF_4$, $NaClO_4$ and $NaPF_6$.

From the viewpoint of giving the effect exerted by the additive and the solid electrolyte to the solid electrolyte layer, the proportion of the solid electrolyte in the solid electrolyte layer is preferably 90 mass % or more, more preferably 95 mass % or more, and may be 100 mass %.

The thickness of the solid electrolyte layer is, for example, 1 to 600 µm.

(2) Positive Electrode

The positive electrode comprises a positive electrode active material and the solid electrolyte and may further comprise the additive.

As the positive electrode active material, a known positive electrode active material usable in a lithium ion secondary battery can be used. Examples of such a positive electrode active material include $LiCoO_2$, $LiNiO_2$, $Li_{1+x}Ni_{1/3}Mn_{1/3}Co_{1/3}O_2$ (x is a positive number), $LiMn_2O_4$, $Li_{1+x}Mn_{2-x-y}M_yO_4$ (M is one or more selected from Al, Mg, Co, Fe, Ni and Zn, x and y are positive numbers), $Li_xTiO_y$ (x and y are positive numbers), $LiMPO_4$ (M is Fe, Mn, Co or Ni), $NaCoO_2$, $NaNiO_2$, $Na_{1+x}Ni_{1/3}Mn_{1/3}Co_{1/3}O_2$ (x is a positive number), $NaMn_2O_4$, $Na_{1+x}Mn_{2-x-y}M_yO_4$ (M is at least one selected from Al, Mg, Co, Fe, Ni and Zn, x and y are positive numbers), $Na_xTiO_y$ (x and y are positive numbers) and $NaMPO_4$ (M is Fe, Mn, Co or Ni).

From the viewpoint of improving the energy density and improving the charge and discharge capacity by forming a sufficient ionic conduction path, the positive electrode active material is preferably 67 to 1900 parts by mass relative to 100 parts by mass of the solid electrolyte. A more preferable content is 230 to 570 parts by mass.

In addition to the positive electrode active material, the solid electrolyte and the additives, the positive electrode may comprise other components such as an alkali metal inorganic salt and a conductive assistant. As the inorganic salt of the alkali metal, the inorganic salt exemplified in the column of the solid electrolyte layer can be used. Examples of the conductive assistant include carbon black such as acetylene black and Ketjen black, carbon nanotube, natural graphite, artificial graphite, and vapor grown carbon fiber (VGCF). The content of other components in the positive electrode is not particularly limited, but is preferably, for example, 10 mass % or less.

The thickness of the positive electrode is, for example, 10 to 600 µm.

The positive electrode may be formed on the current collector. Example of the current collector includes a plate metal such as aluminum.

(3) Negative Electrode

The negative electrode comprises a negative electrode active material and the solid electrolyte, and may further comprise the additive.

As the negative electrode active material, a known negative electrode active material usable in a lithium ion secondary battery can be used. Examples of such a negative electrode active material include carbon materials such as mesocarbon microbeads, graphite, hard carbon and soft carbon, oxides such as $Nb_2O_5$, $Li_4Ti_5O_{12}$, $Na_4Ti_5O_{12}$, and SiO, metals such as In, Al, Si, Sn, Li, and Na, and alloys thereof.

From the viewpoint of improving the energy density and improving the charge and discharge capacity by forming a sufficient ionic conduction path, the negative electrode active material is preferably 40 to 1900 parts by mass relative to 100 parts by mass of the solid electrolyte. A more preferable content is 100 to 570 parts by mass.

In addition to the negative electrode active material, the solid electrolyte and the additives, the negative electrode may comprise other components such as an inorganic salt of an alkali metal and a conductive assistant. As other components for the negative electrode, other components exemplified in the column of the solid electrolyte layer can be used. The content of the other components in the negative electrode is not particularly limited, but it is preferably, for example, 10 mass % or less.

The thickness of the negative electrode is, for example, 10 to 600 µm.

The negative electrode may be formed on the current collector. Examples of the current collector include plate metals such as copper and stainless steel.

(4) All-Solid Secondary Battery

The all-solid secondary battery includes a positive electrode, a negative electrode, and a solid electrolyte layer positioned between the positive electrode and the negative electrode, and at least one of the positive electrode, the negative electrode, and the solid electrolyte layer comprises the additive. Therefore, when the positive electrode comprises the additive, the negative electrode may not comprise an additive, and the negative electrode and the solid electrolyte layer may comprise other binders. The same applies to the case where the additive is comprised in the negative electrode and the case where the additive is comprised in the solid electrolyte layer. Examples of other binders include styrene butadiene rubber, PVdF, PTFE and acrylic resin.

Examples of the positive electrode, the negative electrode, and the solid electrolyte layer which do not comprise the additive include a positive electrode, a negative electrode and a solid electrolyte layer which are known.

From the viewpoints of dispersibility of the slurry, uneven distribution in the coating film, smoothness/strength of the film, adhesion to the current collector, uniformity of the film thickness, further, reduction of the interfacial resistance, or the amount of generation of voids after the heat treatment described later in the positive electrode, the negative electrode or the solid electrolyte layer, the positive electrode, the negative electrode, or the solid electrolyte layer preferably comprises the additive in a range of 0.5 to 20 mass %, more preferably 1 to 10 mass %, and still more preferably 2 to 5 mass % relative to each weight.

Furthermore, at least one of the positive electrode, the negative electrode and the solid electrolyte layer may comprise a heat-treated product of the additive.

The positive electrode and the negative electrode may be formed on the current collector or the solid electrolyte layer.

The all-solid secondary battery may be an aggregate where a plurality of cells is connected in series and/or in parallel, assuming that the positive electrode, the solid electrolyte layer and the negative electrode are one cell.

The all-solid secondary battery may be installed in a casing. Examples of the casing include cans made of metal or resin and bags made of resin film. An all-solid secondary battery has an advantage that a safety device normally equipped in a lithium ion secondary battery is unnecessary.

<Heat-Treated Product of Additive>

By comprising the heat-treated product of the ether chain-containing polyalkylene carbonate (I) or the ether chain-free polyalkylene carbonate (I), the properties of the all-solid battery such as the interfacial resistance, the resistance of the solid electrolyte layer, and the discharge capacity can be improved. From the viewpoint of improving battery performance, the additive preferably comprises a heat-treated product of the ether chain-containing polyalkylene carbonate (I).

The heat-treated product of the additive preferably exhibits at least one property selected from the following (1) to (3):

(1) There is at least one distinct peak within the range of a horizontal axis value 110 to 285 in a spectrum chart where the vertical axis value is the intensity obtained by direct mass spectrometry (DART-MS) of the anisole extract solution of the all-solid secondary battery measured by the method described in the following examples and the horizontal axis value is the ratio of mass to charge (m/z).

(2) There is at least one peak within any range of 3.4 ppm to 3.8 ppm or 0.8 ppm to 1.45 ppm, preferably at least 1 respective peak within each of the ranges in a $^1$H-NMR analysis of the deuterated chloroform extract of the all-solid secondary battery measured by the method described in the following examples.

(3) There is at least one peak within any range of 900 cm$^{-1}$ to 1200 cm$^{-1}$ or 1300 cm$^{-1}$ to 1550 cm$^{-1}$, preferably at least 1 respective peak within each of the ranges in the FT-IR analysis of the pulverized product of the all-solid secondary battery measured by the method described in the following examples.

When exhibiting such a property, the positive electrode and the negative electrode with reduced interfacial resistance between the active material and the solid electrolyte, and the solid electrolyte layer with reduced interfacial resistance between the solid electrolytes can be provided.

In the all-solid secondary battery that has undergone the heat treatment process during production, there are components constituting the heat-treated product of the additive. The sample preparation method and measurement conditions will be described in detail in the column of Examples. Since the thermal decomposition reaction during heat treatment is a complicated reaction and most of it is volatilized, it is not easy to specify the chemical structure of the heat-treated product of the additive, but the chemical structure of the heat-treated product is, for example, presumed to comprise a compound represented by the following formula (IV):

[Chemical formula 7]

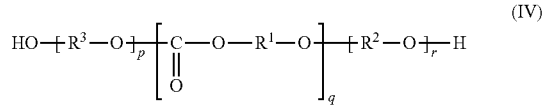

(IV)

(In formula (IV), each of p and r is 0, 1 or 2, q is an integer of 0 to 8 (p+q+r≥1), each of R$^1$ and R$^2$ are a chain alkylene group having 1 to 10 carbon atoms or a cycloalkylene group having 3 to 10 carbon atoms, R$^3$ is R$^1$ or R$^2$, and each of R$^1$ or R$^2$ in the compound is independently the same or different.)

Further, the heat-treated product of the additive may comprises a compound as another component represented by the general formula (V):

[Chemical Formula 8]

(V)

(In the formula (V), R$^4$ is a chain alkylene group having 1 to 10 carbon atoms or a cycloalkylene group having 3 to 10 carbon atoms.)

Examples of R$^1$, R$^2$, R$^3$, or R$^4$ in the heat-treated product of the additive include a linear alkylene group such as an ethylene group, a trimethylene group, a tetramethylene group, a pentamethylene group, a hexamethylene group, a heptamethylene group, an octamethylene group, a nonamethylene group, decamethylene group; a branched chain alkylene group such as a propylene group, a 1,2-butylene group, and a 1,2-dimethylethylene group and; a cycloalkylene group having 3 to 10 carbon atoms such as a cyclopropylene group, a cyclobutylene group, a cyclopentylene group, a cyclohexylene group, a cyclooctylene group, a cyclononylene group and a cyclodecylene group. In the range of 1 to 10 carbon atoms, a linear alkylene group or a branched alkylene group and a cycloalkylene group may be combined. Among these alkylene groups, an ethylene group, a propylene group or a cyclohexylene group is preferred from the viewpoint of availability and improvement of the effect of reducing interfacial resistance.

<Producing Method of Positive Electrode, Negative Electrode and Solid Electrolyte Layer>

The solid electrolyte layer is obtained by a step of dissolving or dispersing a solid electrolyte and an additive in an organic solvent to obtain a slurry (slurry producing step) and a step of applying the slurry to a substrate and drying the slurry to obtain a solid electrolyte film (coating and drying step).

The positive electrode is obtained by a step of dissolving or dispersing a solid electrolyte, an additive and a positive electrode active material in an organic solvent to obtain slurry (slurry producing step) and a step of applying the slurry to a substrate and drying the slurry to obtain a positive electrode (coating and drying step).

The negative electrode is obtained by a step of dissolving or dispersing a solid electrolyte, an additive and a negative electrode active material in an organic solvent to obtain slurry (slurry producing step) and a step of applying the slurry to a substrate and drying the slurry to obtain a negative electrode (coating and drying step).

(1) Slurry Producing Step of Positive Electrode, Negative Electrode and Solid Electrolyte The additive is dissolved or dispersed in an organic solvent together with or following or followed by the solid electrolyte to obtain solid electrolyte slurry. Also, the additive is dissolved or dispersed in an organic solvent together with or following or followed by the positive electrode active material or the negative electrode active material and the solid electrolyte to obtain a positive electrode or negative electrode slurry.

As an organic solvent that can be used, solvent which does not affect the properties of the solid electrolyte and dissolves the additive is usually used. Specific examples thereof include saturated chain hydrocarbons such as n-pentane, n-hexane, heptane, n-octane, nonane, decane, undecane, dodecane, tridecane and tetradecane; halogen-substituted saturated chain hydrocarbons such as carbon tetrachloride, chloroform and dichloroethane; saturated cyclic hydrocarbons such as cyclohexane, cycloheptane and cyclooctane; aromatic hydrocarbons such as benzene, toluene and xylene, halogen-substituted aromatic hydrocarbons such as chlorobenzene and bromobenzene; oxygen-containing chain hydrocarbons such as dioxane, methylethylketone, propylene carbonate, trioxaundecane, trioxanonane, trioxapentadecane, diethylene glycol dimethyl ether and diethylene glycol dimethyl ether; nitrogen-containing saturated hydrocarbons such as triethylamine, propanenitrile, dimethyldiazohexane, trimethyltriazononane, N,N,N',N'-tetramethylethylenediamine and N,N,N',N'',N''-pentamethyldiethylenetriamine and; oxygen-containing aromatic hydrocarbons such as anisole.

Among the organic solvents, an organic solvent capable of dissolving the additive is preferably used. Here, "capable of dissolving" means that 5 g or more of the additive is dissolved in 100 g of an organic solvent. Preferable examples of the organic solvent includes 1,4-dioxane, anisole, diethylene glycol dimethyl ether and 1,2-dichloroethane when the divalent group $R^1$ or $R^2$ in formula (II) and formula (III) is a chain alkylene group. Preferable examples of the organic solvent includes toluene, anisole, 1,2-dichloroethane, diethylene glycol diethyl ether, N,N,N',N'-tetramethylethylenediamine, N,N,N',N'',N''-pentamethyl diethylenetriamine when the divalent group $R^1$ or $R^2$ in formula (II) and formula (III) is a cycloalkylene group.

The conditions for dissolving or dispersing the solid electrolyte and the additive in the organic solvent are not particularly limited as long as sufficient dissolution or dispersion is performed. Dissolution or dispersion may be performed at ordinary temperature (for example, 25° C.), and may be performed while cooling or warming as necessary. Further, if necessary, it may be carried out under any pressure condition of normal pressure, reduced pressure and increased pressure.

The organic solvent is used in such an amount that the solution or dispersion of the solid electrolyte and the additive can be applied. Although such an amount varies depending on the type of the organic solvent, the solid electrolyte and the additive, the amount is, for example, 25 to 230 parts by mass relative to 100 parts by mass of the total of the solid electrolyte and the additive. Further, the organic solvent may be used in the amount so that the solution or dispersion of the positive electrode active material or the negative electrode active material, the solid electrolyte and the additive can be applied. Although such an amount varies depending on the type of the organic solvent, the positive electrode active material, the negative electrode active material, the solid electrolyte and the additive, the amount is, for example, 25 to 230 parts by mass relative to 100 parts by mass of solid content (the positive electrode active material or the negative electrode active material, the solid electrolyte and the additive).

(2) Coating and Drying Step

Each slurry of the positive electrode, the negative electrode, and the solid electrolyte is coated on the substrate, and then the obtained coating film is dried to obtain the positive electrode, the negative electrode, and the solid electrolyte layer, respectively.

The substrate to which the slurry is applied is not particularly limited. For example, a current collector, the solid electrolyte layer or the positive electrode can be used as the substrate when producing the solid electrolyte slurry simultaneously with producing the positive electrode. Further, the negative electrode can be used as the substrate when producing the solid electrolyte slurry simultaneously with producing the negative electrode.

Examples of the coating method include coating with an applicator, doctor blade and bar coater; brush coating; roll coating; spray coating and; electrospray coating.

<Producing Method of all-Solid Secondary Battery>

When producing an all-solid secondary battery, each raw material constituting the positive electrode, the negative electrode, and the solid electrolyte layer is first prepared. These raw materials are as described above. After preparing these raw materials, they are respectively kneaded and then coated and dried to form the positive electrode, the negative electrode and the solid electrolyte layer. After stacking the obtained positive electrode, the solid electrolyte layer and the negative electrode, the obtained laminate is pressed in the stacking direction and fixed to each other, and the laminate is subjected to heat treatment as necessary, thereby the all-solid secondary battery can be produced.

Since at least one of the positive electrode, the negative electrode, and the solid electrolyte layer comprises the additive in the producing process, the all-solid secondary battery comprising the additive can be produced under the above conditions.

<Heat Treatment Step>

The heat treatment of the laminate can be performed under an inert atmosphere such as nitrogen, and argon as necessary. The heat treatment can be performed under normal pressure, under reduced pressure or under increased pressure. When performing the heat treatment under reduced pressure, it may be 100 Pa or less, for example 3 Pa or less. Furthermore, it is preferable that the heat treatment is performed by heating at or below a temperature where the crystal structure of the solid electrolyte does not change. For example, it is known that the crystal structure does not change at about 300° C. or lower in the case of 75Li$_2$S-25P$_2$S$_5$ (75 and 25 are molar ratios, Li$_3$PS$_4$). A more preferable heat treatment temperature is a temperature between T−25° C. and T+50° C., assuming that the decomposition starting temperature of the additive is T° C. More specifically, when the additive consists solely of polyalkylene carbonate (I), the heat treatment temperature is preferably in the range of 215 to 250° C. when $R^1$ and $R^2$ are ethylene groups in the general formula (I), 215 to 250° C. when $R^1$ and $R^2$ are propylene groups in the general formula (I), and 270 to 300° C. when $R^1$ and $R^2$ are cyclohexylene groups in the general formula (I). The heat treatment may be performed while pressing. Although the heat treatment time varies depending on the size of the laminate, the number of laminated layers and the heat treatment temperature, the heat treatment time is usually from 3 to 60 minutes, more preferably from 5 to 30 minutes. In addition, the heat treatment may be performed on each of the solid electrolyte layer, the positive electrode and the negative electrode or on the laminate in which at least one selected from them is combined. The decomposition starting temperature was determined by the method described in the following examples.

EXAMPLE

<Production Example of Ether Chain-Containing Polypropylene Carbonate>

Ether chain-containing polypropylene carbonate (n=3500, m=0, 1 or 2, and 3.5 mass % of (III)) where $R^1$ and $R^2$ are propylene groups, n is 3500, m is 0, 1 or 2 in the formula (I), and the alkylene glycol moiety (III) is 3.5 mass % relative to the alkylene carbonate moiety(II) was produced by the following procedure. It is to be noted that the polyalkylene carbonate in which m is 0, 1 or 2 means that each of an alkylene glycol moiety in which m is 0, an alkylene glycol moiety in which m is 1, and an alkylene glycol moiety in which m is 2 may be present in the polyalkylene carbonate chain.

7.73 g (95 mmol) of zinc oxide, 12.3 g (100 mmol) of glutaric acid, 0.114 g (2 mmol) of acetic acid, and 76.0 g of toluene were charged in a 0.5 L four-necked flask equipped with a stirrer, a nitrogen gas inlet tube, a thermometer, a Dean-Stark tube and a reflux condenser. Then, the temperature was raised to 55° C. while flowing nitrogen at a flow rate of 50 mL/min into the reaction system, and the mixture was reacted by stirring at the same temperature for 4 hours. Thereafter, the temperature was raised to 110° C., further stirred at the same temperature for 2 hours to carry out azeotropic dehydration to remove water, and the mixture was cooled to room temperature to obtain slurry comprising an organozinc catalyst.

After replacing the inside of a 1 L autoclave equipped with a stirrer, a gas inlet tube and a thermometer with a nitrogen atmosphere in advance, 39.1 g of slurry liquid comprising the organozinc catalyst (containing 45 mmol of organozinc catalyst), 192.4 g of dimethyl carbonate and 26.1 g (450 mmol) of propylene oxide were charged. Then, carbon dioxide was charged until the inside of the reaction system reached 1.0 MPa under stirring. Thereafter, the temperature was raised to 60° C., and the polymerization reaction was carried out for 8 hours while replenishing carbon dioxide consumed by the reaction. After completion of the reaction, the autoclave was cooled and depressurized, then filtered, and dried under reduced pressure to obtain 40 g of ether chain-containing polypropylene carbonate. The weight average molecular weight of the obtained ether chain-containing polypropylene carbonate was 357,000 (Mw/Mn=9.02). Other molecular weight PPC (polypropylene carbonate), PEC (polyethylene carbonate) and PCHC (polycyclohexene carbonate) described in this specification were also produced basically in the same manner. For example, JP2012-224675A can be referred to.

<Production Example of Ether Chain-Free PPC>

The ether chain-free polypropylene carbonate (PPC) where $R^1$ and $R^2$ are propylene groups, n is 3400, m is only 0 in the formula (I), and the alkylene glycol moiety (III) is less than 0.1 mass % relative to the alkylene carbonate moiety (II) (n=3400, m is only 0) was produced by the following procedure. It is to be noted that polyalkylene carbonate in which m is only 0 means that substantially no alkylene glycol moiety is present in the polyalkylene carbonate chain.

Ether chain-free PPC was produced by the following method.

According to the method of Synthesis Example described in JP 2010-270278A, 3-tert-butyl-5-[(chloromethyl)dimethylsilyl] salicylaldehyde (0.81 g, 2.2 mmol) and trans-1,2-diaminocyclohexane (0.14 g, 1.1 mmol) was stirred in ethanol (20 mL) at room temperature for 6 hours. After concentration by removing the volatile component under reduced pressure, the precipitate was obtained by filtering and washed with 5 mL of cold hexane to obtain a catalyst precursor as a yellow powder (0.77 g).

Under the nitrogen atmosphere, the obtained catalyst precursor (0.77 g, 0.92 mmol) was dissolved in a mixed solvent of dehydrated methanol (5 mL) and toluene (1 mL), then cobalt acetate anhydrous (0.21 g, 1.3 mmol) was added, and then the mixture was stirred at room temperature for 3 hours. The precipitate was obtained by filtering and washed with cold methanol (5 mL) to obtain a red powder cobalt complex. This was dissolved in dichloromethane (10 mL), then pentafluorobenzoic acid (0.24 g, 1.1 mmol) was added, and the mixture was stirred under air for 15 hours. After concentration by removing the volatile component under reduced pressure, the residue was washed with cold hexane (10 mL) to obtain a cobalt catalyst as a greenish brown solid (0.88 g).

A 1 L autoclave equipped with a stirrer, a gas inlet tube and a thermometer was charged with the cobalt catalyst (0.33 g, 0.28 mmol) and bis(triphenylphosphoranylidene) ammonium chloride (0.16 g, 0.28 mmol), then the inside of the system was replaced with a nitrogen atmosphere in advance and propylene oxide (200 mL, 2.84 mol) was charged. Then carbon dioxide was charged under stirring until the inside of the reaction system reached 1.0 MPa. Thereafter, the temperature was raised to 40° C., and a polymerization reaction was carried out for 12 hours while replenishing carbon dioxide consumed by the reaction. After completion of the reaction, the autoclave was cooled and depressurized, the contents were poured into methanol to precipitate a resin, and the catalyst was removed. The precipitated resin was collected and dried under reduced pressure to obtain 198 g of ether chain-free PPC. The weight average molecular weight of the obtained ether chain-free PPC was 343,000 (Mw/Mn=1.53).

In the present specification, molecular weight refers to weight average molecular weight unless otherwise specified. The molecular weight of the polymer was determined by performing a measurement with a Waters 2695 separation module manufactured by Nippon Waters equipped with a GPC column (trade name Shodex OH Pac SB-800 series manufactured by Showa Denko K.K.) at a column temperature of 40° C., with 0.03 mol/L lithium bromide-N, N-dimethylformamide solution as a eluate at a flow rate of 0.65 mL/min and then comparing with polystyrene having a known weight average molecular weight measured under the same conditions. The composition was determined from a integration ratio of a peak attributed to methine hydrogen adjacent to the propylene carbonate group (5.01 ppm) and peaks attributed to methine hydrogen and methylene hydrogen (3.45-3.65 ppm) adjacent to the propylene glycol group obtained by the measurement with Mercury 400 manufactured by Varian Co. at a temperature of 25° C. in deuterochloroform.

Example 1: Measurement of Decomposition Starting Temperature of Ether Chain-Containing PPC Example 1-1

The thermal decomposition starting temperature of the ether chain-containing PPC (n=3500, m=0, 1 or 2, and 3.5 mass % of (III)) obtained in the above production example was 232° C. The residual ratio at the thermal decomposition end temperature was 3.5 mass %.

The thermal decomposition starting temperature was measured with TG/DTA7220 manufactured by Hitachi High-Tech Science Co., Ltd. or thermal analysis system SSC5200H TG/DTA 320 manufactured by Seiko Instruments Inc. under a nitrogen atmosphere at a heating rate of 10° C./min from room temperature to 500° C. The temperature at intersection of tangential line before starting the weight loss and the tangent line drawn such that the gradient between the inflection points in the decomposition curve is maximized where the horizontal axis is temperature and the vertical axis is the weight ratio of the sample (TG %) was determined as the thermal decomposition starting temperature. The residual rate at the thermal decomposition termination temperature is defined as the residual ratio of the weight ratio (TG %) at the intersection of the tangent line drawn such that the gradient between the inflection points in the decomposition curve is maximum and the tangent line at the weight reduction end point.

Example 1-2 to Example 1-5

The residual amounts (residual rate (%)) of the all-solid secondary battery additive of ether chain-containing PPC (n=3500, m is 0, 1 or 2, and 3.5 mass % of (III)) with added lithium chloride at the decomposition starting temperature and the decomposition end temperature were measured. A methyl ethyl ketone solution of the ether chain-containing PPC and an ethanol solution of lithium chloride were mixed so that lithium chloride would be 20, 100, 1000, 5000 ppm relative to the ether chain-containing PPC, and dried at 50° C. Table 1-1 shows the thermal decomposition starting temperatures of the obtained lithium chloride-added ether chain-containing PPC. The thermal decomposition starting temperature and the residual rate were determined in the same manner as in Example 1-1.

TABLE 1-1

Thermal Decomposition Starting Temperature and Residual Rate of Ether Chain-containing PPC added with Lithium Chloride in Various Concentration

|  | Lithium Chloride Concentration Relative to Ether Chain-containing PPC (ppm) | Thermal Decomposition Starting Temperature (° C.) | Residual Rate at Thermal Decomposition End Temperature (%) |
| --- | --- | --- | --- |
| Example 1-2 | 20 | 212 | 2.7 |
| Example 1-3 | 100 | 188 | 2.9 |
| Example 1-4 | 1000 | 145 | 3.2 |
| Example 1-5 | 5000 | 143 | 4.7 |

The thermal decomposition starting temperature and residual rate of the ether chain-containing PPC were able to be adjusted depending on the concentration of lithium chloride.

Examples 1-6 to 1-19

The residual amounts (residual rate (%)) of the all-solid secondary battery additive of ether chain-containing PPC (n=3500, m is 0, 1 or 2, and 3.5 mass % of (III)) added with various alkali metal salt at the decomposition starting temperature and the decomposition end temperature were measured. The methyl ethyl ketone solution of the ether chain-containing PPC and the ethanol solution or aqueous solution of various alkali metal salts were mixed so that the alkali metal salt would be 1000 ppm relative to the ether chain-containing PPC and dried at 50° C. Table 1-2 shows the thermal decomposition starting temperature and the residual rate of the obtained alkali metal salt-added ether chain-containing PPC. The thermal decomposition starting temperature and the residual rate were determined in the same manner as in Example 1-1.

TABLE 1-2

Thermal Decomposition Starting Temperature and Residual Rate of Alkali Metal Salt-Added Ether Chain-Containing PPC

|  | Alkali Metal Salt | Thermal Decomposition Starting Temperature (° C.) | Residual Rate at Thermal Decomposition End Temperature (%) |
| --- | --- | --- | --- |
| Example 1-6 | Lithium Hydroxide | 169 | 5.4 |
| Example 1-7 | Lithium Iodide | 181 | 3.4 |
| Example 1-8 | Lithium Acetate | 187 | 4.1 |
| Example 1-9 | Lithium Nitrate | 189 | 4.4 |
| Example 1-10 | Lithium Benzoate | 193 | 2.5 |
| Example 1-11 | Lithium Trifluoromethane-sulfonate | 206 | 4.0 |
| Example 1-12 | Lithium Perchlorate | 205 | 0.4 |
| Example 1-13 | Lithium Bis(fluorosulfonyl)imide | 207 | 10.3 |
| Example 1-14 | Lithium Phosphate | 224 | 6.8 |
| Example 1-15 | Lithium Fluoride | 209 | 5.9 |
| Example 1-16 | Sodium Fluoride | 205 | 3.6 |
| Example 1-17 | Sodium Chloride | 222 | 14.6 |
| Example 1-18 | Potassium Chloride | 205 | 3.3 |
| Example 1-19 | Cesium Chloride | 199 | 4.2 |

The thermal decomposition starting temperature and the residual ratio of the ether chain-containing PPC were able to be adjusted by the addition of various alkali metal salts.

<Production Example of $Li_3PS_4$>

1.379 g of $Li_2S$ (manufactured by Furuuchi Chemical Co., Ltd.) and 2.222 g of $P_2S_5$ (manufactured by Aldrich) were mixed in an agate mortar and added in a $ZrO_2$ pot (capacity 80 ml), and further 106 g of $ZrO_2$ ball (diameter 5 mm), 8 g of heptane (super dehydrated, manufactured by Wako Pure Chemical Industries, Ltd.) were added, and the container was completely sealed under an argon atmosphere. The container was set on a planetary ball mill (Premium Line P-7, manufactured by Fritsch) and subjected to 20 cycles under conditions of 500 rpm for 1 hour rotation and 15 minutes pause. The pot was opened under an argon atmosphere and then dried at room temperature. The contents were sieved with a stainless steel mesh (150 µm) to obtain a product. From the scanning electron microscope (SEM) observation of the obtained solid electrolyte particles, the particle diameter was 10 to 15 µm.

$Li_3PS_4$ was added into $ZrO_2$ pot (volume 80 ml) and 120 g of $ZrO_2$ ball (diameter 1 mm), 26.7 g of heptane (super dehydrated, manufactured by Wako Pure Chemical Industries, Ltd.) and 0.3 g of butyl ether (super dehydrated, manufactured by Wako Pure Chemical Industries, Ltd.) were added thereto. Then the container was completely sealed under an argon atmosphere. The container was set in a planetary ball mill (Premium Line P-7, produced by Fritsch), and subjected to 20 cycles under conditions of 200 rpm for 1 hour rotation and 15 minutes pause. After opening the pot under an argon atmosphere, the contents were filtered through a stainless steel mesh (150 µm) and dried to obtain a product. From the observation of a scanning electron microscope (SEM) of the obtained solid electrolyte particles, the particle diameter was 1 to 2 µm.

Example 2: Ionic Conductivity Measurement of Aliphatic Polycarbonate-Containing Solid Sulfide Compact and Sheet

Example 2-1

$Li_3PS_4$ and a vehicle (ether chain-containing PPC:1,2-dichloroethane=10:90 mass %) were mixed so that the ether chain-containing PPC (n=3500, m is 0, 1 or 2, and 3.5 mass % of (III)) was 1 mass % and 3 mass % or 6 mass % relative to $Li_3PS_4$. The obtained mixture was mixed with a planetary stirring/defoaming apparatus (Maserter KK-250S, manufactured by KURABO Corp.), and dispersed for 1 minute with an ultrasonic homogenizer (ultrasonic dispersing/crushing apparatus UP100H for laboratory manufactured by Hillcher) to obtain a solid electrolyte slurry. The powder obtained by air-dry at 25° C. was pressed at 333 MPa (at 25° C.) to obtain a compact. Further, the slurry was cast on the surface of an aluminum foil (manufactured by Hohsen Corp.) and air-dried overnight to obtain a solid sulfide sheet comprising ether chain-containing PPC.

The ionic conductivity was measured by the following method. The AC impedance was measured with Solartron analytical 1400 Cell test system manufactured by Toyo Corp within a measurement frequency range of 1 MHz to 0.01 Hz and at an amplitude of 10 mV at room temperature (about 25° C.) while pressing the sample at 333 MPa. The ionic conductivity was calculated from the resistance value obtained from the AC impedance measurement, the powder compact thickness or the sheet thickness measured with a micrometer, and the diameter (10 mm) of the stainless electrode.

Example 2-2

A compact and a sheet were produced, and the ionic conductivities were calculated in the same manner as in Example 2-1 except that the solvent was changed from 1,2-dichloroethane to anisole and mixing was performed so that the ether chain-containing PPC was 3 mass %, 6 mass % or 10 mass % relative to $Li_3PS_4$.

Comparative Example 2-1

A compact and a sheet were produced, and the ionic conductivities were calculated in the same manner as in Example 2-1 except that ether chain-containing PPC and the solvent were changed to styrene butadiene rubber (styrene-ethylene-butylene-styrene copolymer (SEBS)) (manufactured by JSR) and heptane.

Comparative Example 2-2

A compact and a sheet were produced, and the ionic conductivities were calculated in the same manner as in Example 2-1 except that ether chain-containing PPC and the solvent were changed to ethylene oxide-propylene oxide copolymer (EPC) (CP2000 manufactured by Sumitomo Seika Co., Ltd.) and toluene.

TABLE 2-1

| | Compact 1 mass % | Compact 3 mass % | Compact 6 mass % | Compact 10 mass % | Sheet 1 mass % | Sheet 3 mass % | Sheet 6 mass % | Sheet 10 mass % |
|---|---|---|---|---|---|---|---|---|
| Example 2-1 | $2.2 \times 10^{-4}$ | $1.9 \times 10^{-4}$ | $1.6 \times 10^{-4}$ | — | $2.2 \times 10^{-4}$ | $1.8 \times 10^{-4}$ | $1.5 \times 10^{-4}$ | — |
| Example 2-2 | — | — | $2.0 \times 10^{-4}$ | $1.6 \times 10^{-4}$ | — | $2.3 \times 10^{-4}$ | $2.1 \times 10^{-4}$ | $2.9 \times 10^{-4}$ |
| Com. Example 2-1 | — | $1.7 \times 10^{-4}$ | $9.1 \times 10^{-5}$ | Too high resistance to measure | $4.2 \times 10^{-4}$ | — | $3.8 \times 10^{-5}$ | Too high resistance to measure |
| Com. Example 2-2 | $1.4 \times 10^{-4}$ | $4.6 \times 10^{-5}$ | Too high resistance to measure | Too high resistance to measure | $1.8 \times 10^{-4}$ | $5.1 \times 10^{-5}$ | Too high resistance to measure | Too high resistance to measure |

Unit: S/cm

Examples 2-1 and 2-2 shows high ionic conductivities as compared to Comparative Examples 2-1 and 2-2 especially when the compact or sheet comprised the ether chain-containing PPC at a high content. It was shown that the ether chain-containing PPC was difficult to inhibit ionic conduction between solid sulfides.

Example 2-3

A compact was produced and the ionic conductivity was calculated in the same manner as in Example 2-2 except that the ether chain-containing PPC in Example 2-2 was changed to ultrahigh molecular weight ether chain-containing PPC (MW:500,000, n=4900, m is 0, 1 or 2 and 3.0 mass % of (III)) and the ultrahigh molecular weight ether chain-containing PPC was mixed so as to be 6 mass % relative to $Li_3PS_4$.

Example 2-4

A compact was produced and the ionic conductivity was calculated in the same manner as in Example 2-2 except that the ether chain-containing PPC in Example 2-2 was changed to low molecular weight ether chain-containing PPC (MW 200,000, n=2000, m is 0, 1 or 2 and 3.0 mass % of (III)) and the low molecular weight ether chain-containing PPC was mixed so as to be 6 mass % relative to $Li_3PS_4$.

Example 2-5

A compact was produced and the ionic conductivity was calculated in the same manner as in Example 2-2 except that the ether chain-containing PPC in Example 2-2 was changed to ether chain-containing PPC with molecular weight 300,000 (MW 300,000, n=2900, m is 0, 1 or 2 and 0.5 mass % of (III)) and ether chain-containing PPC with molecular weight 300,000 was mixed so as to be 6 mass % relative to $Li_3PS_4$.

Example 2-6

A compact was produced and the ionic conductivity was calculated in the same manner as in Example 2-2 except that the ether chain-containing PPC in Example 2-2 was changed to ether chain-free PPC (MW 340,000, n=3400 and m is only 0) and the ether chain-free PPC was mixed so as to be 6 mass % relative to $Li_3PS_4$.

Example 2-7

A compact was produced, and the ionic conductivity was calculated in the same manner as in Example 2-2 except that the ether chain-containing PPC in Example 2-2 was changed to mixture of ether chain-free PPC (MW 340,000, n=3400 and m is only 0) and 3 mass % of polypropylene glycol (PPG) (Mn=3000) relative to ether chain-free PPC (MW 340,000, n=3400 and m is only 0) and the mixture was mixed so as to be 6 mass % relative to $Li_3PS_4$.

Example 2-8

A compact was produced, and the ionic conductivity was calculated in the same manner as in Example 2-2 except that the ether chain-containing PPC in Example 2-2 was changed to ether chain-free polycyclohexene carbonate (PCHC) (MW 60,000, n=400 and m is only 0) and the PCHC was mixed so as to be 6 mass % relative to $Li_3PS_4$.

Example 2-9

A compact was produced, and the ionic conductivity was calculated in the same manner as in Example 2-2 except that the ether chain-containing PPC in Example 2-2 was changed to ether-containing PPC (MW 360,000, n=3500 and m is 0, 1 or 2 and 3.5 mass % of (III)) added with 1000 ppm of lithium chloride relative to the ether chain-containing PPC and the ether chain-containing PPC was mixed so as to be 6 mass % relative to $Li_3PS_4$.

TABLE 2-2

| | Additive | Ionic Conductivity of Compact |
|---|---|---|
| Example 2-3 | Ultrahigh MW ether chain-containing PPC (MW 500,000, n = 4900, m is 0, 1 or 2 and 3.0 mass % of (III)) | $1.2 \times 10^{-4}$ |
| Example 2-4 | Low MW ether chain-containing PPC (MW 200,000, n = 2000, m is 0, 1 or 2 and 3.0 mass % of (III)) | $1.7 \times 10^{-4}$ |
| Example 2-5 | Ether chain-containing PPC (MW 300,000, n = 2900, m is 0, 1 or 2 and 0.5 mass % of (III)) | $1.2 \times 10^{-4}$ |
| Example 2-6 | Ether chain-free PPC (MW 340,000, n = 3400 and m is 0) | $1.4 \times 10^{-4}$ |
| Example 2-7 | Ether chain-free PPC (MW 340,000, n = 3400 and m is 0) + PPG (Mn = 3000) | $8.7 \times 10^{-5}$ |
| Example 2-8 | Ether chain-free polycyclohexene carbonate (PCHC) (MW 60,000, n = 400 and m is 0) | $1.3 \times 10^{-4}$ |
| Example 2-9 | 1000 ppm lithium chloride-added ether chain-containing PPC (MW 360,000, n = 3500, m is 0, 1 or 2 and 3.5 mass % of (III)) | $1.8 \times 10^{-4}$ |

Unit: S/cm

Example 3: Ionic Conductivity Measurement of Aliphatic Polycarbonate-Containing Solid Sulfide Compact after Vacuum Heat Treatment

Example 3-1

The solid sulfide powder comprising 6 mass % of ether chain-containing PPC of Example 2-2 was subjected to vacuum heat treatment at each temperature (room temperature, 215° C., 225° C., 235° C., 250° C., 270° C. and 290° C.) for 30 minutes. A compact was produced from the obtained powder and the AC impedance was measured to calculate the ionic conductivity according to Example 2-1.

Comparative Example 3-1

The solid sulfide powder was subjected to vacuum heat treatment at each temperature (room temperature, 215° C., 225° C., 235° C., 250° C., 270° C. and 290° C.) for 30 minutes. A compact was produced from the obtained powder, and the AC impedance was measured to calculate the ionic conductivity.

TABLE 3-1

| | r.t. | 215° C. | 225° C. | 235° C. | 250° C. | 270° C. | 290° C. |
|---|---|---|---|---|---|---|---|
| Example 3-1 | $1.2 \times 10^{-4}$ | $2.7 \times 10^{-4}$ | $3.6 \times 10^{-4}$ | $4.5 \times 10^{-4}$ | $4.9 \times 10^{-4}$ | $3.1 \times 10^{-4}$ | $2.6 \times 10^{-4}$ |
| Com. Example 3-1 | $4.2 \times 10^{-4}$ | — | $3.9 \times 10^{-4}$ | $3.2 \times 10^{-4}$ | $3.6 \times 10^{-4}$ | $2.9 \times 10^{-4}$ | $1.5 \times 10^{-4}$ |

Unit: S/cm

According to Example 3-1, since the ionic conductivity at 215° C. is lower than 225° C., 235° C., 250° C. and 270° C., it is conceivable that the thermal decomposition of ether chain-containing PPC at 215° C. was insufficient and the residual amount was large. In both Example 3-1 and Comparative Example 3-1, the ionic conductivities slightly decreased at 290° C. According to Example 3-1, an ionic conductivity equal to or higher than that of Comparative Example 3-1 with no additive was obtained by performing the heat treatment in the range of 225° C. to 270° C.

Example 3-2

The solid sulfide powder comprising 6 mass % of the additive in Example 2-3 was subjected to vacuum heat treatment at 225° C. for 30 minutes. A compact was produced from the obtained powder, and the AC impedance was measured to calculate the ionic conductivity.

Example 3-3

The solid sulfide powder comprising 6 mass % of the additive in Example 2-4 was subjected to vacuum heat treatment at 225° C. for 30 minutes. A compact was produced from the obtained powder, and the AC impedance was measured to calculate the ionic conductivity.

Example 3-4

The solid sulfide powder comprising 6 mass % of the additive in Example 2-5 was subjected to vacuum heat treatment at 225° C. for 30 minutes. A compact was produced from the obtained powder, and the AC impedance was measured to calculate the ionic conductivity.

Example 3-5

The solid sulfide powder comprising 6 mass % of the additive in Example 2-6 was subjected to vacuum heat treatment at 225° C. for 30 minutes. A compact was produced from the obtained powder, and the AC impedance was measured to calculate the ionic conductivity.

Example 3-6

The solid sulfide powder comprising 6 mass % of the additive in Example 2-7 was subjected to vacuum heat treatment at 225° C. for 30 minutes. A compact was produced from the obtained powder, and the AC impedance was measured to calculate the ionic conductivity.

Example 3-7

The solid sulfide powder comprising 6 mass % of the additive in Example 2-9 was subjected to vacuum heat treatment at 140° C. for 30 minutes. A compact was produced from the obtained powder, and the AC impedance was measured to calculate the ionic conductivity.

On the other hand, since the thermal decomposition starting temperature of the styrene-ethylene-butylene-styrene copolymer (SEBS) is around 400° C., the ionic conductivity did not change and remained at $10^{-5}$ S/cm level even when performing the heat-treatment at 225° C. in Comparative Example 2-1.

In Example 3-7, the decomposition starting temperature of the PPC decreased to 140° C. by the addition of lithium chloride to the PPC and the ionic conductivity of the solid sulfide heat-treated at 140° C. was improved to the same level as the original solid sulfide.

Example 4: Production of Positive Electrode Composite Sheet and Production of Positive Electrode Half Cell and Electrochemical Evaluation Thereof

Example 4-1

LiNbO$_3$-coated positive electrode active material Li(CoNiMn)$_{1/3}$O$_2$ (manufactured by Toda Kogyo Co.) (NMC), solid sulfide Li$_3$PS$_4$, acetylene black (AB, DENKA BLACK HS-100, manufactured by Denki Kagaku Kogyo K.K.), and ether chain-containing PPC (n=3500, m is 0, 1 or 2 and 3.5 mass % of (III)) were weighed so that active material:sulfide:AB:ether chain-containing PPC=80:20:2:3, and anisole was added so that the solid content was 60 mass %. These were mixed with a planetary stirring and defoaming apparatus (Maserter KK-250S, manufactured by KURABO INC.) and then dispersed for 1 minute with an ultrasonic homogenizer (ultrasonic dispersion and crushing apparatus UP100H for laboratory manufactured by Hillcher) to obtain positive electrode composite slurry. Thereafter, the slurry was applied to the surface of an aluminum foil (manufactured by Hohsen Corp.) with a thickness of 200 μm with an applicator and air dried overnight to obtain a positive electrode composite sheet.

TABLE 3-2

| | Additive | Heat Treatment Temperature and Time | Ionic Conductivity after Heat treatment |
|---|---|---|---|
| Example 3-2 | Ultrahigh MW ether chain-containing PPC (MW500,000, n = 4900, m is 0, 1 or 2 and 3.0 mass % of (III)) | 225° C., 30 min. | $3.7 \times 10^{-4}$ |
| Example 3-3 | Low MW ether chain-containing PPC (MW200,000, n = 2000, m is 0, 1 or 2 and 3.0 mass % of (III)) | 225° C., 30 min. | $5.7 \times 10^{-4}$ |
| Example 3-4 | Ether chain-containing PPC (MW300,000, n = 2900, m is 0, 1 or 2 and 0.5 mass % of (III)) | 225° C., 30 min. | $3.6 \times 10^{-4}$ |
| Example 3-5 | Ether chain-free PPC (MW340,000, n = 3400 and m is 0 only) | 225° C., 30 min. | $4.9 \times 10^{-4}$ |
| Example 3-6 | Ether chain-free PPC (MW340,000, n = 3400 and m is 0 only) + PPG(Mn = 3000) | 225° C., 30 min. | $2.1 \times 10^{-4}$ |
| Example 3-7 | 1000ppm lithium chloride-added ether chain-containing PPC (MW 360,000, n = 3500, m is 0, 1 or 2 and 3.5 mass % of (III)) | 140° C., 30 min. | $3.9 \times 10^{-4}$ |

Unit: S/cm

In the additive-containing solid sulfide powders of Examples 3-2 to 3-7, the ionic conductivity was improved after the heat treatment as compared to before the heat treatment and was several times before the heat treatment.

A positive electrode half-cell was produced by laminating each so that solid sulfide Li$_3$PS$_4$ was positioned between the positive electrode composite sheet and In foil (manufactured by Nilaco, thickness 0.1 mm).

The charge and discharge test and the AC impedance measurement were performed on the obtained positive electrode half-cell. Charging and discharging were performed with BTS2004H manufactured by Nagano Co., Ltd. at a cut-off voltage of 3.7-2 V (vs. In) and a current density of 64 μA/cm$^2$ under constant current charging and constant current discharging. The AC impedance measurement was performed with Solartron analytical 1400 Cell test system manufactured by Toyo Technica Co., Ltd. after initial charge at a measurement frequency range of 1 MHz to 0.01 Hz and amplitude of 10 mV at room temperature.

In this specification, the discharge capacity refers to the value per unit weight of the active material of the electrode, and in the case of the full cell, it refers to the value per positive electrode active material weight.

Example 4-2

In the same manner as in Example 4-1 except that the mass ratio of active material:sulfide:AB:ether chain-containing PPC was changed to 80:20:2:1, a positive electrode half-cell was produced through producing a positive electrode composite sheet, thereafter the charge and discharge test and the impedance measurement were performed.

Example 4-3

In the same manner as in Example 4-1 except that the mass ratio of active material:sulfide:AB:ether chain-containing PPC was changed to 80:20:2:6, a positive electrode half-cell was produced through producing a positive electrode composite sheet, thereafter the charge and discharge test and the impedance measurement were performed.

Examples 4-4, 4-5 and 4-6

In the same manner as in Example 4-1, 4-2 and 4-3 respectively except that the laminate of the solid sulfide Li$_3$PS$_4$ and the positive electrode composite sheet was subjected to a vacuum heat treatment at 225° C. for 30 minutes and then In was laminated, a heat-treated positive electrode half-cell was produced through producing a positive electrode composite sheet and laminating the positive electrode composite sheet and the solid sulfide, thereafter the charge and discharge test and the impedance measurement were performed.

TABLE 4-1

|  | Initial Discharge Capacity (mAh/g) | Positive Electrode Active Material-Solid Sulfide Interfacial Resistance(Ω) |
|---|---|---|
| Example 4-1 | 123 | 638 |
| Example 4-2 | 126 | 301 |
| Example 4-3 | 28 | 1182 |
| Example 4-4(with heat treatment) | 151 | 14 |
| Example 4-5(with heat treatment) | 121 | 33 |
| Example 4-6(with heat treatment) | 126 | 72 |

In Examples 4-4 and 4-6 (with heat treatment), decrease of the interfacial resistance between the positive electrode active material and the solid sulfide and increase of the discharge capacity as compared to Examples 4-1 and 4-3 respectively (without heat treatment) were observed. Comparing Example 4-5 (with heat treatment) with Example 4-2 (without heat treatment), although the discharge capacity was not affected since the content of the ether chain-containing PPC was low (1%) in the positive electrode, the interfacial resistance between the positive electrode active material and the solid sulfide decreased by the heat treatment (Example 4-5).

[Example 4-7]: Production of Positive Electrode Composite Sheet with Ether Chain-Containing PPC (MW 360,000, n=3,500, m is 0, 1 or 2, and 3.5 Mass % of (III)) (Active Material:Solid Sulfide=90 Mass %:10 Mass %)

In the same manner as in Example 4-4 except that the mass ratio of active material:solid sulfide:AB:ether chain-containing PPC was changed to 90:10:2:3, a heat-treated positive electrode half-cell was produced through producing a positive electrode composite sheet, laminating the positive electrode composite sheet and solid sulfide and performing a vacuum heat treatment, thereafter the charge and discharge test and the impedance measurement were performed.

[Example 4-8]: Production of Positive Electrode Composite Sheet with Ether Chain-Containing Ultrahigh Molecular Weight PPC (MW 500,000, n=4900, m=0, 1 or 2, and 3 Mass % of (III)) (Active Material:Solid Sulfide=90 Mass %:10 Mass %)

In the same manner as in Example 4-7 except that the ether chain-containing PPC (MW 360,000, n=3500, m is 0, 1 or 2 and 3.5 mass % of (III)) was changed to ether chain-containing ultrahigh molecular weight PPC (MW 500,000, n=4900, 1 or 2, and 3 mass % of (III)), a heat-treated positive electrode half-cell was produced through producing a positive electrode composite sheet, laminating the positive electrode composite sheet and solid sulfide and performing a vacuum heat treatment, thereafter the charge and discharge test and the impedance measurement were performed.

TABLE 4-2

|  | Initial Discharge Capacity (mAh/g) | Positive Electrode Active Material-Solid Sulfide Interfacial Resistance (Ω) | Capacity Retention Rate (%) at 30th Cycle |
|---|---|---|---|
| Example 4-7 (with heat treatment) | 140 | 49 | 72 |
| Example 4-8 (with heat treatment) | 130 | 83 | 71 |

When using the ether chain-containing ultrahigh molecular weight PPC (MW 500,000, n=4900, m is 0, 1 or 2, and 3 mass % of (III)), the discharge capacity, the interfacial resistance and the capacity retention rate were equivalent to when using the ether chain-containing PPC (MW 360,000, n=3500, m is 0, 1 or 2 and 3.5 mass % of (III)).

[Example 4-9]: Production of Positive Electrode Composite Sheet with Lithium Chloride (1000 ppm)-Containing Ether Chain-Containing PPC (n=3500, m is 0, 1 or 2 and 3.5 Mass % of (III)) (Active Material:Solid Sulfide=80 Mass %:20 Mass %)

In the same manner as in Example 4-4 except that the ether chain-containing PPC (MW 360,000, n=3500, m is 0, 1 or 2 and 3.5 mass % of (III)) was changed to lithium chloride (1000 ppm)-containing ether chain-containing PPC (MW 360,000, n=3500, m is 0, 1 or 2 and 3.5 mass % of (III)) and the vacuum heat treatment was changed from at 225° C. for 30 minutes to 150° C. for 30 minutes a heat-treated positive electrode half-cell was produced through producing a positive electrode composite sheet, laminating the positive electrode composite sheet and solid sulfide and performing a vacuum heat treatment, thereafter the charge and discharge test and the impedance measurement were performed.

TABLE 4-3

|  | Initial discharge capacity (mAh/g) | Positive Electrode Active Material-Solid Sulfide Interfacial Resistance (Ω) |
|---|---|---|
| Example 4-9 (with heat treatment at Low temperature) | 157 | 29 |

It was shown that when using the lithium chloride-containing ether chain-containing PPC, the interfacial resistance between the positive electrode active material and the solid sulfide was reduced by a low temperature heat treatment at 150° C. and an initial discharge capacity was equivalent to Example 4-4 where the heat treatment at 225° C. was performed. Heat treatment at a low temperature was possible with the PPC comprising lithium chloride, which is industrially advantageous to produce a battery.

Example 4-10

In the same manner as in Example 4-1 except that the ether chain-containing PPC (n=3500, m is 0, 1 or 2 and 3.5 mass % of (III)) was changed to ether chain-free PPC (MW=340,000, n=3400 and m is only 0), a positive electrode half-cell was produced through producing a positive electrode composite sheet, thereafter the charge and discharge test and the impedance measurement were performed.

Example 4-11

In the same manner as in Example 4-1 except that the ether chain-containing PPC was changed to additive obtained by mixing ether chain-free PPC (n=3400 and m is only 0) and 3 mass % of polypropyleneglycol (PPG) (Mn=3000) relative to the ether chain-free PPC (n=3400 and m is only 0) with the mass ratio of active material:solid sulfide:AB:3 mass % PPG-containing ether chain-free PPG=80:20:2:3, a positive electrode half-cell was produced through producing a positive electrode composite sheet, thereafter the charge and discharge test and the impedance measurement were performed.

Example 4-12

In the same manner as in Example 4-1 except that the ether chain-containing PPC was changed to ether chain-containing PEC (MW is 190,000, n=2200 and m is 0, 1 or 2 and 2.5 mass % of (III)), the mass ratio was changed to active material:sulfide:AB:ether chain-containing PEC=80:20:1:3 and anisole was changed to 1,2-dichloroethane, a positive electrode half-cell was produced through producing a positive electrode composite sheet, thereafter the charge and discharge test and the impedance measurement were performed.

Examples 4-13, 4-14 and 4-15

In each Examples 4-13, 4-14 and 4-15, in the same manner as in Examples 4-10, 4-11 and 4-12 respectively, except that vacuum heat treatment was performed in the same manner as in Example 4-4, a heat-treated positive electrode half-cell was produced through producing a positive electrode composite sheet, laminating the positive electrode composite sheet and solid sulfide and performing a vacuum heat treatment, thereafter the charge and discharge test and the impedance measurement were performed.

TABLE 4-4

|  | Remarks | Initial Discharge Capacity (mAh/g) | Solid Electrolyte Layer Resistance(Ω) | Positive Electrode Active Material-Solid Sulfide Interfacial Resistance (Ω) |
|---|---|---|---|---|
| Example 4-1 | Ether chain-containing | 123 | 621 | 638 |
| Example 4-4 (with heat treatment) | Ether chain-containing | 151 | 593 | 13 |
| Example 4-10 | Ether Chain-free | 65 | 579 | 1873 |
| Example 4-11 | Ether Chain-free (+PPG) | 126 | 417 | 851 |
| Example 4-12 | Ether chain-containing (PEC) | 35 | — | 4110 |
| Example 4-13 (with heat treatment) | Ether Chain-free | 141 | 345 | 37 |
| Example 4-14 (with heat treatment) | Ether Chain-free (+PPG) | 136 | 433 | 39 |
| Example 4-15 (with heat treatment) | Ether chain-containing (PEC) | 63 | — | 59 |

In any of Examples 4-4, 4-13, 4-14 and 4-15, the heat-treated product of polyalkylene carbonate (I) remains in the heat-treated positive electrode half cell. In Examples 4-4 and 4-15, it is conceivable that a heat-treated product mainly comprising the structure derived from the alkylene glycol moiety (III) remains after the vacuum heat treatment. In Example 4-13, it is conceivable that a heat-treated product comprising a structure derived from the alkylene carbonate moiety (II) remains. Further, in Example 4-14, when using the additive where ether chain-free PPC (n=3,400, m is only 0) and 3 mass % of polypropylene glycol (PPG) (Mn=3000) relative to the ether chain-free PPC (n=3400, m is only 0) were mixed, it is conceivable that the heat-treated product comprising the structure derived from the alkylene carbonate moiety (II) and PPG remains after the vacuum heat treatment. In any of the examples, the interfacial resistance between the positive electrode active material and the solid electrolyte was reduced to less than one twentieth as compared to that before the heat treatment. On the other hand, the bulk resistance of the solid electrolyte did not change significantly before and after the heat treatment. As above, the discharge capacity increased by decreasing the interfacial resistance between the positive electrode active material and the solid electrolyte with the heat treatment. Also, it was found that the discharge capacity tends to increase as the interfacial resistance value of the positive electrode active material between the solid electrolyte decreases. In particular, as in Example 4-4, it is suggested that the residue of the heat-treated product having a structure derived from the ether chain moiety, that is, the alkylene glycol moiety (III) contributes to the improvement of battery performance.

Example 5: Production of Negative Electrode Composite Sheet and Production of Negative Electrode Half Cell and Electrochemical Evaluation Thereof

[Example 5-1]: Production of Negative Electrode Composite (Graphite) Sheet

For a negative electrode composite sheet, Spherical graphite (CGB-100 manufactured by Nippon Graphite Industries, Co., Ltd.) as negative electrode active material, solid sulfide ($Li_2S$—$P_2S_5$), acetylene black (AB, DENKA BLACK HS-100, manufactured by Denki Kagaku Kogyo K.K.) and ether chain-containing PPC (n=3500, m=0, 1 or 2 and 3.5 mass % of (III)) were weighed so that the mass ratio of active material:solid sulfide:AB:ether chain-containing PPC=58:42:1:3, and then anisole was added so that the solid content was 50 mass %. These were mixed with a planetary stirring and defoaming apparatus (Maserter KK-250S, manufactured by KURABO INC.) to obtain negative electrode composite slurry. Thereafter, the slurry was applied to the surface of a copper foil (manufactured by Hohsen Corp.) with a thickness of 200 μm with an applicator and air dried overnight to obtain a negative electrode composite sheet.

A negative electrode half-cell was produced by laminating each so that solid sulfide $Li_3PS_4$ was positioned between the negative electrode composite sheet and Li(manufactured by Nilaco Corp., Li thickness 0.2 mm)-In (manufactured by Nilaco Corp., In thickness 0.1 mm) laminate.

The charge and discharge test and the AC impedance measurement were performed in the same manner as in Example 4-1 except that the cut-off voltage of the Charge and discharge test was set to 0.88 to –0.57 V (vs. Li—In).

Example 5-2

In the same manner as in Example 5-1 except that the copper foil was peeled from the laminate of the negative electrode composite and the solid electrolyte, then the vacuum heat treatment was performed at 240° C. for 30 minutes, and then the Li—In laminate and that a copper foil was affixed to the negative electrode composite side and the Li—In laminate was laminated on the solid sulfide $Li_3PS_4$ side, a heat-treated negative electrode half-cell was produced through producing a negative electrode composite sheet and performing a vacuum heat treatment thereafter the charge and discharge test and the impedance measurement were performed in the production of the negative half-cell according to Example 5-1.

TABLE 5-1

| | Initial Discharge Capacity(mAh/g) |
|---|---|
| Example 5-1 | 248 |
| Example 5-2(with heat treatment) | 308 |

In the heat-treated negative electrode half cell (Example 5-2), an increase of the discharge capacity was observed as compared to before the heat treatment (Example 5-1).

Example 5-3

In the same manner as in Example 5-1 except that the mass ratio of active material:electrolyte:AB:ether chain-containing PPC in the negative electrode composite was changed to 58:42:1:6, a negative electrode half-cell was produced through producing a negative electrode composite sheet, thereafter the charge and discharge test and the impedance measurement were performed.

Example 5-4

In the same manner as in Example 5-2 (with heat-treatment) except that the mass ratio of active material:electrolyte:AB:ether chain-containing PPC in the negative electrode composite was changed to 58:42:1:6, a heat-treated negative electrode half-cell was produced through producing a negative electrode composite sheet and performing the vacuum heat treatment, thereafter, the charge and discharge test and the impedance measurement were performed.

TABLE 5-2

| | Initial Discharge Capacity(mAh/g) |
|---|---|
| Example 5-3 | 103 |
| Example 5-4(with heat treatment) | 111 |

[Example 5-5]: Production of Negative Electrode (Silicon) Half Cell and Electrochemical Evaluation In the same manner as in Example 5-2 except that the mass ratio of silicone (manufactured by Alfa Aesar, 50 nm) as negative electrode active material, solid sulfide ($Li_3PS_4$), acetylene black (AB, DENKA BLACK HS-100, manufactured by Denki Kagaku Kogyo K.K.), ether chain-containing PPC (n=3500, m=0, 1 or 2 and 3.5 mass % of (III)) was changed to the active material:solid sulfide:AB:ether chain-containing PPC=60:40:6:3, the cut-off voltage was changed to 0.88 to –0.62 V (vs. Li—In) and the rate was changed to 0.05 C, a heat-treated negative electrode half-cell was produced through producing a negative electrode composite sheet, and performing the vacuum heat treatment, thereafter the charge and discharge test and the impedance measurement were performed.

TABLE 5-3

|  | Initial Discharge Capacity (mAh/g) | Negative Electrode Active Material-Solid Electrolyte Interfacial Resistance(Ω) |
|---|---|---|
| Example 5-5(with heat treatment) | 3410 | 52 |

[Example 5-6]: Production of Negative Electrode (Tin) Half Cell and Electrochemical Evaluation In the same manner as in Example 5-2 except that the mass ratio of tin nanoparticles (synthetic product of Osaka Municipal Technical Research Institute) as negative electrode active material, solid sulfide ($Li_3PS_4$), acetylene black (AB, DENKA BLACK HS-100, manufactured by Denki Kagaku Kogyo K.K.), ether chain-containing PPC (n=3500, m is 0, 1 or 2 and 3.5 mass % of (III)) is changed to the active material:solid sulfide:AB:ether chain-containing PPC=60:40:6:3, the cut off-voltage was changed to 0.88 to −0.57 V (vs. Li—In) and the rate was changed to 0.05 C, a heat-treated negative electrode half-cell was produced through producing a negative electrode composite sheet, and performing the vacuum heat treatment, thereafter the charge and discharge test and the impedance measurement were performed.

TABLE 5-4

|  | Initial Discharge Capacity (mAh/g) | Negative Electrode Active Material-Solid Electrolyte Interfacial Resistance(Ω) |
|---|---|---|
| Example 5-6(with heat treatment) | 559 | 51 |

[Example 5-7]: Production of Negative Electrode (Tin-Iron Alloy) Half Cell and Electrochemical Evaluation In the same manner as in Example 5-2 except that the mass ratio of tin-iron ($Sn_2Fe$) nanoparticles (synthetic product by Osaka Municipal Technical Research Institute) as negative electrode active material, solid sulfide ($Li_3PS_4$), acetylene black (AB, DENKA BLACK HS-100, manufactured by Denki Kagaku Kogyo K.K.), ether chain-containing PPC (n=3500, m is 0, 1 or 2 and 3.5 mass % of (III)) was changed to active material:solid sulfide:AB:ether chain-containing PPC=60:40:6:3, the cut off-voltage was changed to 0.88 to −0.57 V (vs. Li—In) and the rate was changed to 0.05 C, a heat-treated negative electrode half-cell was produced through producing a negative electrode composite sheet, and performing the vacuum heat treatment, thereafter the charge and discharge test and the impedance measurement thereof were performed.

TABLE 5-5

|  | Initial Discharge Capacity (mAh/g) |
|---|---|
| Example 5-7(with heat treatment) | 521 |

Example 6: Production of Full Cell and Electrochemical Evaluation

Example 6-1

An all-solid battery was produced by laminating so that solid sulfide powder $Li_3PS_4$ is positioned between the positive electrode composite sheet of Example 4-1 and the negative electrode composite sheet of Example 5-1. The charge and discharge test and the AC impedance measurement were performed in the same manner as in Example 4-1 except that the cut-off voltage of charge and discharge test was 4.2 to 3 V.

Example 6-2

In the all-solid battery obtained in Example 6-1, the copper foil was peeled off, then the vacuum heat treatment was performed at 225° C. for 30 minutes, and thereafter copper foil was attached thereon to obtain a heat-treated all-solid battery. The charge and discharge test and the AC impedance measurement were performed in the same manner as in Example 4-1 except that the cut-off voltage of charge and discharge test was 4.2 to 3 V.

TABLE 6-1

|  | Initial Discharge Capacity (mAh/g) | Positive Electrode Active Material-Solid Electrolyte Interfacial Resistance(Ω) |
|---|---|---|
| Example 6-1 | 92 | 967 |
| Example 6-2(with heat treatment) | 121 | 23 |

In the heat-treated full cell (Example 6-2), decrease of the interfacial resistance between the positive electrode active material and the solid sulfide and increase of the discharge capacity were observed, as compared to before the heat treatment (Example 6-1).

Example 7: Preparation of All Sheet Type Full Cell

Example 7-1

The sheet having 10 mass % of the ether chain-containing PPC relative to the electrolyte in the solid electrolyte sheets according to Example 2-2 was laminated between the positive electrode composite sheet of Example 4-1 and the negative electrode composite sheet of Example 5-3 to obtain an all-solid battery (ether chain-containing PPC content: positive electrode/solid electrolyte layer/negative electrode=3/10/6 mass %). The thicknesses of the positive electrode and the negative electrode were 44 μm and 26 μm, respectively.

The charge and discharge test and the AC impedance measurement were performed in the same manner as in Example 4-1 except that the cut-off voltage of charge and discharge test was 4.2 to 3 V.

Example 7-2

The sheet having 3 mass % of the ether chain-containing PPC relative to the electrolyte in the solid electrolyte sheets according to Example 2-2 was laminated between the positive electrode composite sheet of Example 4-1 and the negative electrode composite sheet of Example 5-3 to obtain an all-solid battery (ether chain-containing PPC content: positive electrode/solid electrolyte layer/negative electrode=3/3/6 mass %). The thicknesses of the positive electrode and the negative electrode were 30 μm and 34 μm, respectively.

The charge and discharge test and the AC impedance measurement were performed in the same manner as in Example 4-1 except that the cut-off voltage of charge and discharge test was 4.2 to 3 V.

Example 7-3

The sheet having 3 mass % of the ether chain-containing PPC relative to the electrolyte in the solid electrolyte sheets according to Example 2-2 was laminated between the positive electrode composite sheet of Example 4-1 and the negative electrode composite sheet of Example 5-1 to obtain an all-solid battery (the ether chain-containing PPC content: positive electrode/solid electrolyte layer/negative electrode=3/3/3 mass %). The thickness of the positive electrode was 53 μm.

The charge and discharge test and the AC impedance measurement were performed in the same manner as in Example 4-1 except that the cut-off voltage of charge and discharge test was 4.2 to 3 V.

Examples 7-4, 7-5 and 7-6

In the all sheet type full cell of Examples 7-1, 7-2 and 7-3, after peeling off the copper foil, then vacuum heat treatment was performed at 225° C. for 30 minutes and then a copper foil was attached to obtain a heat-treated all sheet type full cell. The thicknesses of the positive electrode and the negative electrode of Example 7-4 were 40 μm and 36 μm, respectively. The thicknesses of the positive electrode and the negative electrode of Example 7-5 were 36 μm and 34 μm, respectively. The thickness of the positive electrode of Example 7-6 was 28 μm.

The charge and discharge test and the AC impedance measurement were performed in the same manner as in Example 4-1 except that the cut-off voltage of charge and discharge test was 4.2 to 3 V.

TABLE 7-1

|  | Initial Discharge Capacity (mAh/g) | Positive Electrode Active Material-Solid Electrolyte Interfacial Resistance(Ω) |
|---|---|---|
| Example 7-1 | 13 | 4506 |
| Example 7-2 | 22 | 3238 |
| Example 7-3 | 103 | 827 |
| Example 7-4(with heat treatment) | 107 | 184 |
| Example 7-5(with heat treatment) | 99 | 209 |
| Example 7-6(with heat treatment) | 122 | 61 |

In the heat-treated all sheet type full cell (Examples 7-4, 7-5 and 7-6), the interfacial resistance between the positive electrode active material and solid sulfide decreased and the discharge capacity increased with compared to before heat treatment (Examples 7-1, 7-2 and 7-3).

Example 8: Thinning of Solid Electrolyte Layer by Spraying and Production of Sheet Type Full Cell Onto the surface of the positive electrode composite sheet of Example 4-1 and/or the surface of the negative electrode composite sheet of Example 5-1, slurry where 2 mass % SEBS relative to the solid electrolyte was added and dispersed in toluene was sprayed to coat a solid electrolyte layer. These positive electrode composite sheet and negative electrode composite sheet were laminated so that the solid electrolyte layer was the center and pressed to obtain a sheet type full cell. The initial discharge capacity was 100 mAh/g, and the interfacial resistance between the positive electrode active material and the solid electrolyte layer was 504Ω. The film thickness of the solid electrolyte layer was 50 to 60 μm from the cross-sectional SEM image of the battery.

Example 9: Detection and Analysis of Heat-Treated Product of Additive

[DART-MS Measurement]

Figure 1B:
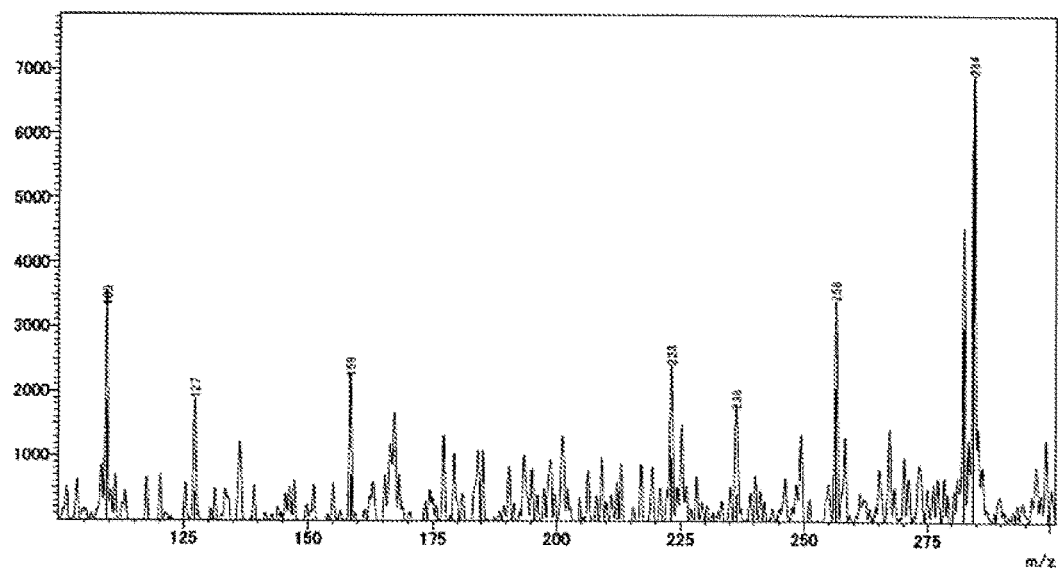
FIG. 1B shows a spectrum chart obtained by DART-MS measurement of an anisole extract of a battery using the ether chain-free PPC according to Example 4-13.
Figure 1C:
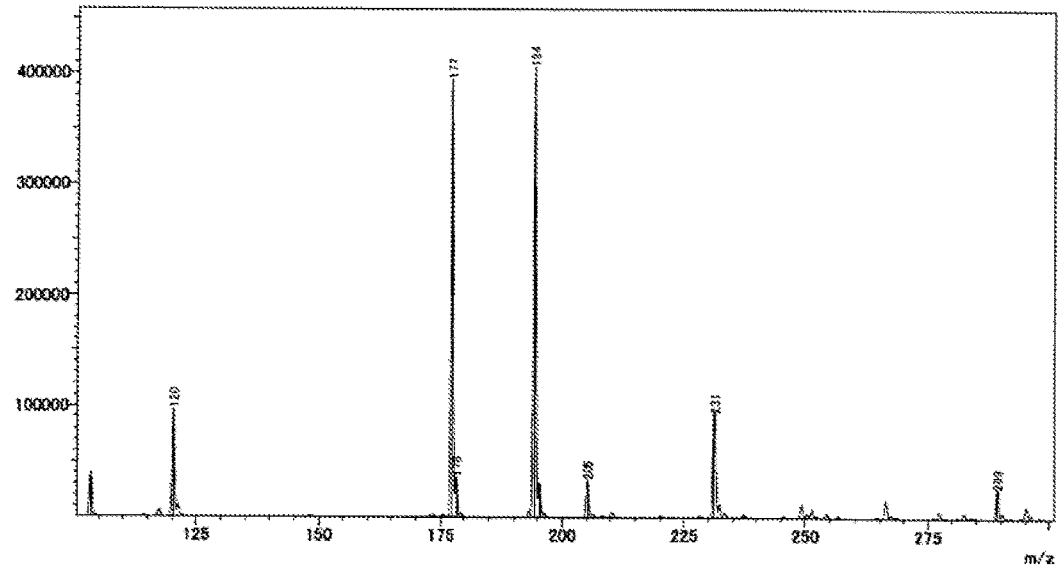
FIG. 1C shows a spectrum chart obtained by DART-MS measurement of ether chain-containing PPC before heat treatment.
Figure 1D:
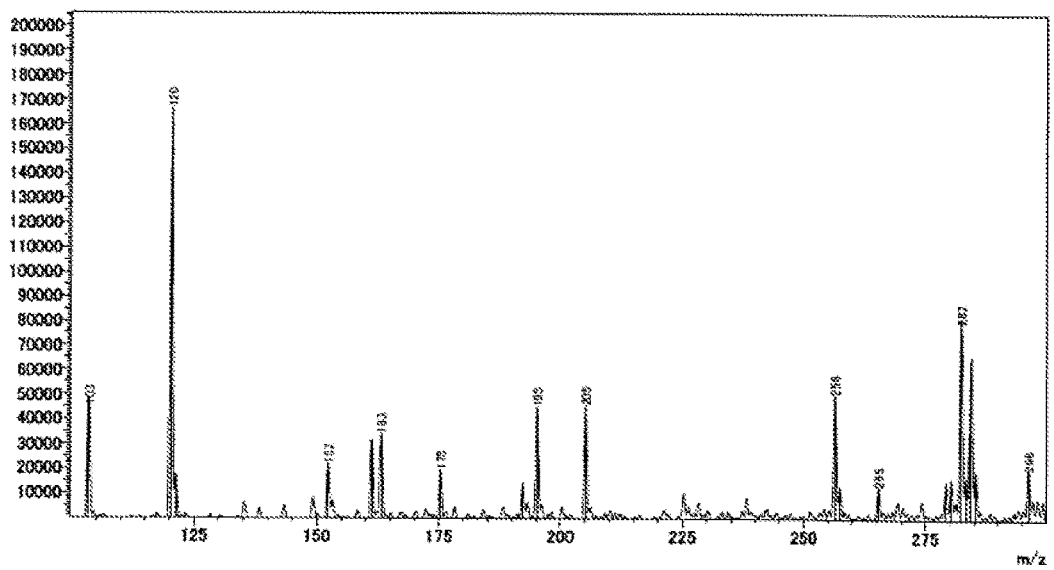
FIG. 1D shows a spectrum chart obtained by DART-MS measurement of ether chain-free PPC before heat treatment.
Figure 1E:
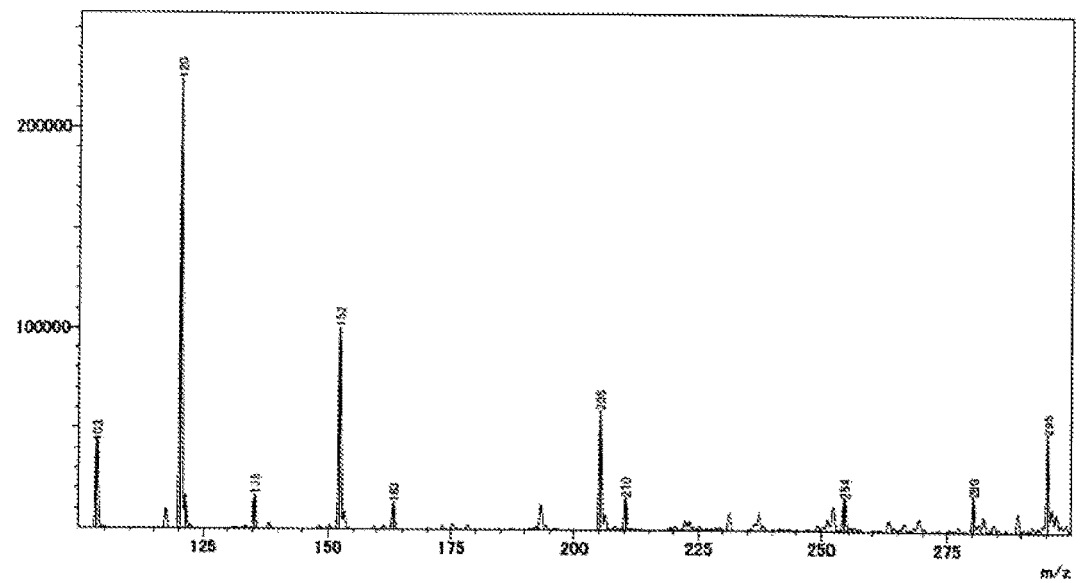
FIG. 1E shows a spectrum chart obtained by DART-MS measurement of a heat-treated product (225° C.) of ether chain-containing PPC.
Figure 1F:
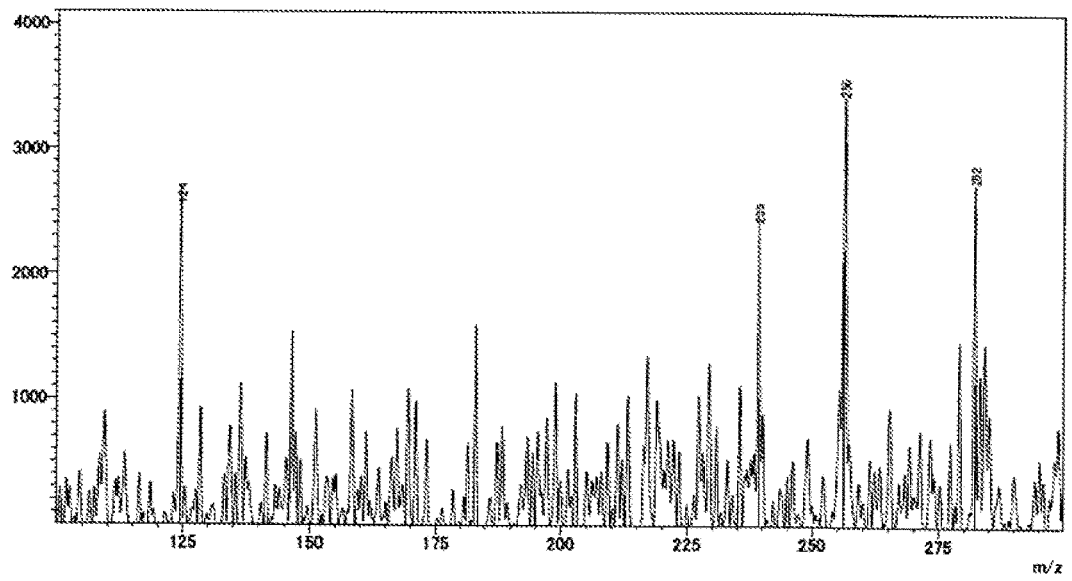
FIG. 1F shows a spectrum chart obtained by DART-MS measurement of a heat-treated product (225°) of ether chain-free PPC.

A solution obtained by immersing the battery according to Example 7-6 (the ether chain-containing PPC was used) in anisole for 10 minutes and irradiating with ultrasonic wave for 1 minute was analyzed with DART-MS (Direct Analysis in Real Time Coupled to Mass Spectrometry: direct mass spectrometry. DART-SVP manufactured by AMR Co. and LCMS-2020 manufactured by Shimadzu Co.). In the same manner, the anisole extract of the battery according to Example 4-13 (the ether chain-free PPC was used) was analyzed. For comparison, the ether chain-containing PPC before heat treatment, the ether chain-free PPC before heat treatment, the heat-treated product (225° C.) of the ether chain-containing PPC and the heat-treated product (225° C.) of the ether chain-free PPC were measured as a solid. As a result, peaks were found in the range of m/z=120 to 122. These were estimated to be peaks derived from a compound in the formula (IV) where p=0, q=1, r=0, $R^1$ is a propylene group and proton is added or a compound in the formula (IV) where $R^4$ is a propylene group (propylene carbonate ($C_4H_6O_3$)) and ammonia is added in the atmosphere is added. In addition, peaks were found in the range of m/z=254 to 256. These were estimated to be peaks derived from a compound in the formula (IV) where p=1, q=1, r=1 or p=0, q=1. r=2 and $R^1$, $R^2$ and $R^3$ are propylene groups and ammonia is added. In addition, peaks were found in the range of m/z=280 to 282. These were estimated to be a peak derived from a compound in the formula (IV) where p=0, q=2, r=1, $R^1$ and $R^2$ are propylene groups and proton is added. FIGS. 1A to 1F show the spectrums of the measurement result.

[$^1$H-NMR Measurement]

Figure 2A:
FIG. 2A shows a spectrum chart obtained by $^1$H-NMR measurement of a deuterated chloroform extract of a battery using the ether chain-containing PPC according to Example 7-6.
Figure 2B:
FIG. 2B shows a spectrum chart obtained by $^1$H-NMR measurement of a deuterated chloroform extract of a battery using the ether chain-free PPC according to Example 4-13.
Figure 2C:
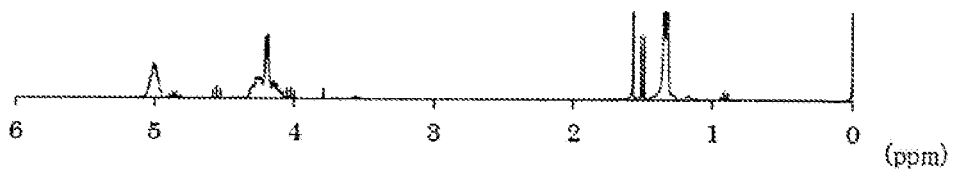
FIG. 2C shows a spectrum chart obtained by $^1$H-NMR measurement (deuterated chloroform) of ether chain-containing PPC before heat treatment.
Figure 2D:
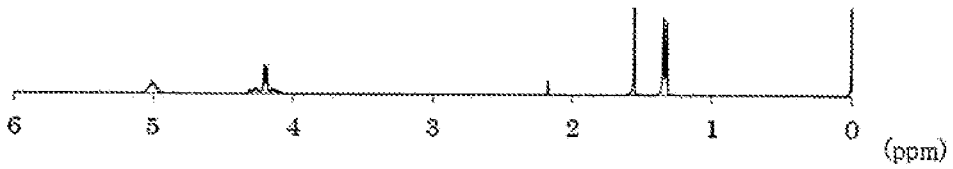
FIG. 2D shows a spectrum chart obtained by $^1$H-NMR measurement (deuterated chloroform) of ether chain-free PPC before heat treatment.
Figure 2E:
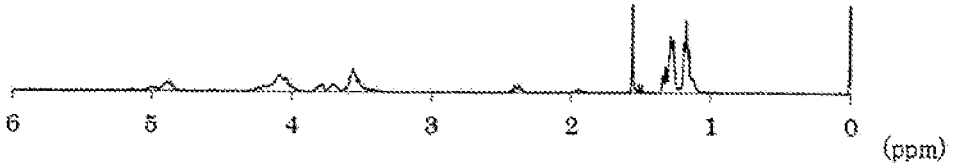
FIG. 2E shows a spectrum chart obtained by $^1$H-NMR measurement (deuterated chloroform) of a heat-treated product (225° C.) of ether chain-containing PPC.
Figure 2F:
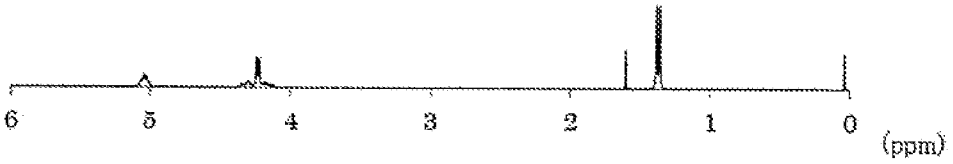
FIG. 2F shows a spectrum chart obtained by $^1$H-NMR measurement (deuterated chloroform) of a heat-treated product (225° C.) of ether chain-free PPC.

$^1$H-NMR measurement of supernatant liquid obtained by immersing the battery according to Example 7-6 (the ether chain-containing PPC was used) in deuterochloroform and irradiating with ultrasonic waves was performed with NMR (JNM-AL-300, 300 MHz manufactured by JEOL). Immersion in deuterated chloroform was performed at 30° C. for 10 minutes and ultrasonic irradiation was performed at 300° for 1 minute. In the same manner, $^1$H-NMR measurement of a deuterated chloroform extract of the battery according to Example 4-13 (the ether chain-free PPC was used) was performed. As a result, peaks estimated to be derived from the heat-treated product of the additive in the battery were found in the vicinity of 3.5 ppm, 1.3 ppm and 0.9 ppm. For comparison, a deuterated chloroform solutions of the ether chain-containing PPC before heat treatment, the ether chain-free PPC before heat treatment, the heat-treated product (225° C.) of the ether chain-containing PPC, and the heat-treated product (225° C.) of the ether chain-free PPC were measured. FIGS. 2A to 2F show the spectrums of the measurement result.

[FT-IR Measurement]

Figure 3A:
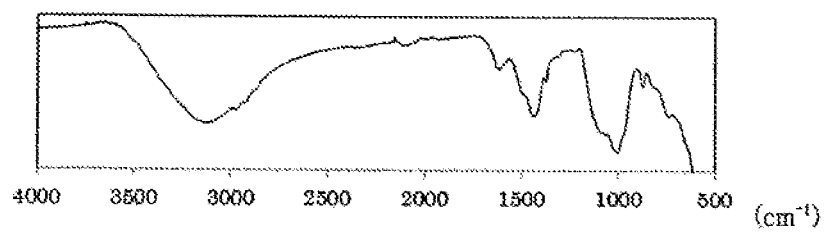
FIG. 3A shows a spectrum chart obtained by FT-IR measurement of a pulverized product of a battery using the ether chain-containing PPC according to Example 7-6 is shown.
Figure 3B:
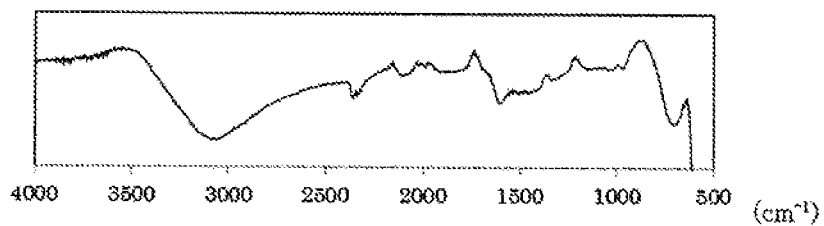
FIG. 3B shows a spectrum chart obtained by FT-IR measurement of a pulverized product of a battery using the ether chain-free PPC according to Example 4-13 is shown.
Figure 3C:
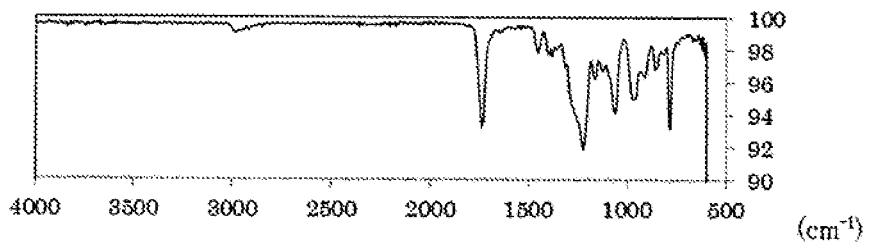
FIG. 3C shows a spectrum chart obtained by FT-IR measurement of ether chain-containing PPC before heat treatment.
Figure 3D:
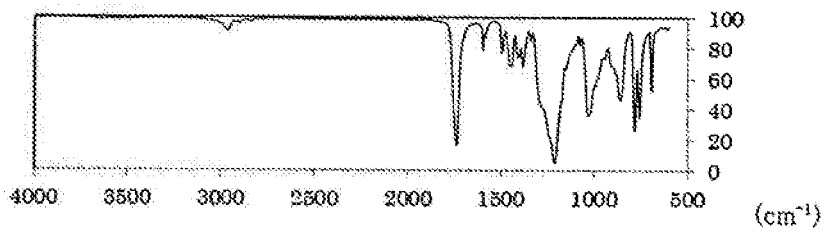
FIG. 3D shows a spectrum chart obtained by FT-IR measurement of ether chain-free PPC before heat treatment.
Figure 3E:
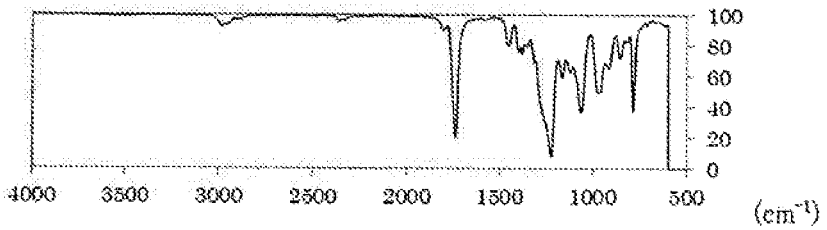
FIG. 3E shows a spectrum chart obtained by FT-IR measurement of heat-treated product (225° C.) with ether chain-containing PPC.
Figure 3F:
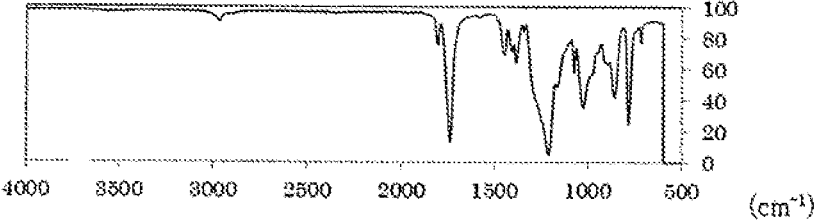
FIG. 3F shows a spectrum chart obtained by FT-IR measurement of a heat-treated product (225° C.) of ether chain-free PPC.

Powder obtained by pulverizing the battery according to Example 7-6 (the ether chain-containing PPC was used) was measured with FT-IR (NICOLET 6700, manufactured by Thermo Scientific) equipped with ATR (Durascope manufactured by SENSIR Technologies). In the same manner, powder obtained by pulverizing the battery according to Example 4-13 (the ether chain-free PPC was used) was measured. As a result, peaks estimated to be derived from the heat-treated product of the additive in the battery were found in the vicinity of 1420 cm$^{-1}$, 1090 cm$^{-1}$ and 1010 cm$^{-1}$. For comparison, the ether chain-containing PPC before heat treatment, the ether chain-free PPC before heat treatment, the heat-treated product (225° C.) of the ether chain-containing PPC, the heat-treated product (225° C.) of the ether chain-free PPC were measured as a solid. FIGS. 3A to 3F show the spectrums of the measurement result.

From the above results, it was revealed that, even when heat-treated after producing a battery with an aliphatic polycarbonate, the remained materials derived from the aliphatic polycarbonate can be detected by DART-MS, $^1$H-NMR or FT-IR.

The invention claimed is:

1. An all-solid secondary battery comprising a positive electrode, a negative electrode and a solid electrolyte layer positioned between the positive electrode and the negative electrode,
wherein the solid electrolyte layer comprises an additive in a range of 0.5 to 20 mass % relative to the solid electrolyte layer,
wherein the additive comprises a polyalkylene carbonate,
wherein the polyalkylene carbonate has an alkylene carbonate moiety (II) represented by general formula (II):

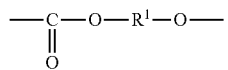
(II)

wherein in the formula (II), R$^1$ is a chain alkylene group having 1 to 10 carbon atoms or a cycloalkylene group having 3 to 10 carbon atoms and optionally an alkylene glycol moiety (III) represented by general formula (III):

(III)

wherein in the formula (III), R$^2$ is a chain alkylene group having 1 to 10 carbon atoms or a cycloalkylene group having 3 to 10 carbon atoms, m is 0, 1 or 2 and each of R$^2$ in the alkylene glycol moiety (III) is the same or different.

2. The all-solid secondary battery according to claim 1, wherein the polyalkylene carbonate is a polyalkylene carbonate (I) represented by the general formula (I):

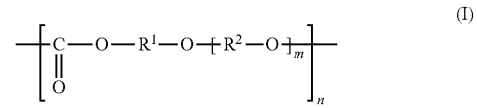
(I)

wherein in the formula (I), each of R$^1$ and R$^2$ is a chain alkylene group having 1 to 10 carbon atoms or a cycloalkylene group having 3 to 10 carbon atoms, m is 0, 1 or 2, n is an integer of 10 to 15000,
each of R$^1$, R$^2$ and m in the polyalkylene carbonate (I) chain is independently the same or different.

3. The all-solid secondary battery according to claim 1, wherein each of R$^1$ and R$^2$ is an ethylene group, a propylene group or a cyclohexylene group.

4. The all-solid secondary battery according to claim 1, wherein the additive further comprises an alkali metal salt.

5. The all-solid secondary battery according to claim 4, wherein the alkali metal salt is at least one selected from lithium chloride, lithium hydroxide, lithium iodide, lithium acetate, lithium nitrate, lithium benzoate and cesium chloride.

6. The all-solid secondary battery according to claim 1, wherein the additive further comprises polyalkylene glycol.

7. A solid electrolyte layer for an all-solid secondary battery comprising a positive electrode, a negative electrode and the solid electrolyte layer positioned between the positive electrode and the negative electrode,
characterized in that the solid electrolyte layer comprises a heat-decomposed product of an additive comprising polyalkylene carbonate and a solid electrolyte,
wherein the polyalkylene carbonate has an alkylene carbonate moiety (II) represented by general formula (II):

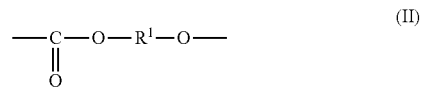
(II)

wherein the formula (II), R$^1$ is a chain alkylene group having 1 to 10 carbon atoms or a cycloalkylene group having 3 to 10 carbon atoms and
optionally an alkylene glycol moiety (III) represented by general formula (III):

(III)

wherein the formula (III), R$^2$ is a chain alkylene group having 1 to 10 carbon atoms or a cycloalkylene group having 3 to 10 carbon atoms, m is 0, 1 or 2 and each of R$^2$ in the alkylene glycol moiety (III) is the same or different.

8. The solid electrolyte layer according to claim 7, wherein the solid electrolyte is an inorganic solid electrolyte selected from $Z_2S-M_xS_y$ wherein Z is one or more selected from Li and Na, M is one or more selected from P, Si, Ge, B, Al and Ga, and x and y are numbers giving stoichiometric ratios depending on the type of M, $Z_2S-M_nS_m-ZX$, wherein Z is one or more selected from Li and Na, M is one or more selected from P, Si, Ge, B, Al and Ga, X is one or more selected from Cl, Br and I, and n and m are numbers giving stoichiometric ratios depending on the type of M, $Li_{3x}La_{2/3-x}TiO_3$ wherein $0<x<0.17$, $Li_{1+x}Al_xTi_{2-x}(PO_4)_3$ wherein $0<x<2$, $Li_7La_3Zr_2O_{12}$ and $Li_{1+x}Al_xGe_{2-x}(PO_4)_3$ wherein $0<x<2$.

9. A positive electrode for an all-solid secondary battery comprising the positive electrode, a negative electrode and a solid electrolyte layer positioned between the positive electrode and the negative electrode,
characterized in that the positive electrode comprises a positive electrode active material, a solid electrolyte and a heat-decomposed product of an additive comprising polyalkylene carbonate,
wherein the polyalkylene carbonate has an alkylene carbonate moiety (II) represented by general formula (II):

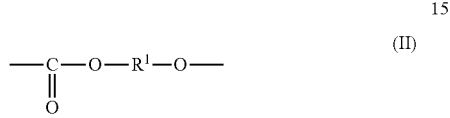

wherein the formula (II), $R^1$ is a chain alkylene group having 1 to 10 carbon atoms or a cycloalkylene group having 3 to 10 carbon atoms and optionally an alkylene glycol moiety (III) represented by general formula (III):

wherein the formula (III), $R^2$ is a chain alkylene group having 1 to 10 carbon atoms or a cycloalkylene group having 3 to 10 carbon atoms, m is 0, 1 or 2 and each of $R^2$ in the alkylene glycol moiety (III) is the same or different.

10. A negative electrode for an all-solid secondary battery comprising a positive electrode, the negative electrode and a solid electrolyte layer positioned between the positive electrode and the negative electrode,
characterized in that the negative electrode comprises a negative electrode active material, a solid electrolyte and a heat-decomposed product of an additive comprising polyalkylene carbonate,
wherein the polyalkylene carbonate has an alkylene carbonate moiety (II) represented by general formula (II):

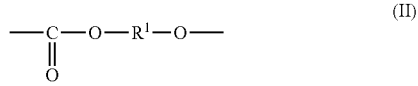

wherein the formula (II), $R^1$ is a chain alkylene group having 1 to 10 carbon atoms or a cycloalkylene group having 3 to 10 carbon atoms and
optionally an alkylene glycol moiety (III) represented by general formula (III):

wherein the formula (III), $R^2$ is a chain alkylene group having 1 to 10 carbon atoms or a cycloalkylene group having 3 to 10 carbon atoms, m is 0, 1 or 2 and each of $R^2$ in the alkylene glycol moiety (III) is the same or different.

11. A producing method of an all-solid secondary battery characterized in comprising
a step of obtaining a solid electrolyte slurry by dissolving or dispersing a solid electrolyte and an additive comprising polyalkylene carbonate in an organic solvent;
a step of obtaining a positive electrode slurry by dissolving or dispersing the additive, a solid electrolyte and a positive electrode active material in an organic solvent,
a step of obtaining a negative electrode slurry by dissolving or dispersing the additive, a solid electrolyte and a negative electrode active material in an organic solvent,
a step of obtaining a solid electrolyte layer, a positive electrode and a negative electrode by coating and drying each of the slurries on a substrate,
a step of obtaining a laminate by laminating the solid electrolyte layer, the positive electrode and the negative electrode; and
a step of heat-treating the laminate to heat-decompose the additive;
wherein the polyalkylene carbonate has an alkylene carbonate moiety (II) represented by general formula (II):

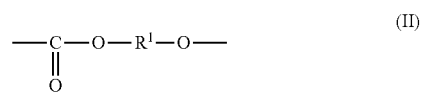

wherein the formula (II), $R^1$ is a chain alkylene group having 1 to 10 carbon atoms or a cycloalkylene group having 3 to 10 carbon atoms and
optionally an alkylene glycol moiety (III) represented by general formula (III):

wherein the formula (III), $R^2$ is a chain alkylene group having 1 to 10 carbon atoms or a cycloalkylene group having 3 to 10 carbon atoms, m is 0, 1 or 2 and each of $R^2$ in the alkylene glycol moiety (III) is the same or different.

12. The producing method of an all-solid secondary battery according to claim 11,
wherein the solid electrolyte is $Li_2S$—$P_2S_5$ and each of $R^1$ and $R^2$ is an ethylene group, a propylene group or a cyclohexylene group.

13. The producing method of an all-solid secondary battery according to claim 11,
wherein the heat-treating is performed at a temperature between T−25° C. and T+50° C. where T is a decomposition starting temperature of the additive, and
wherein the thermal decomposition starting temperature is a temperature at intersection of tangential line before starting the weight loss and the tangential line drawn such that the gradient between the inflection points in the decomposition curve is maximized where the horizontal axis is temperature and the vertical axis is the weight ratio of the sample (TG %), in the heat treatment of the additive under a nitrogen atmosphere at a heating rate of 10° C./min from room temperature to 500° C.

14. The producing method of an all-solid secondary battery according to claim 11,
wherein the inorganic solid electrolyte is selected from $Z_2S$-$M_xS_y$, wherein Z is one or more selected from Li and Na, M is one or more selected from P, Si, Ge, B, Al and Ga, and x and y are numbers giving stoichiometric ratios depending on the type of M, $Z_2S\text{-}M_nS_m\text{-}ZX$ wherein Z is one or more selected from Li and Na, M is one or more selected from P, Si, Ge, B, Al and Ga, X is one or more selected from Cl, Br and I, and n and m are numbers giving stoichiometric ratios depending on the type of M, $Li_{3x}La_{2/3-x}TiO_3$ wherein $0<x<0.17$, $Li_{1+x}Al_xTi_{2-x}(PO_4)_3$ wherein $0<x<2$, $Li_7La_3Zr_2O_{12}$ and $Li_{1+x}Al_xGe_{2-x}(PO_4)_3$ wherein $0<x<2$.

* * * * *